US012574493B2

(12) United States Patent
Jung et al.

(10) Patent No.: US 12,574,493 B2
(45) **Date of Patent: *Mar. 10, 2026**

(54) DISPLAY DEVICE

(71) Applicant: Samsung Display Co., LTD., Yongin-si (KR)

(72) Inventors: Ji Won Jung, Yongin-si (KR); Guanghai Jin, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 52 days.

This patent is subject to a terminal disclaimer.

(21) Appl. No.: 18/437,003

(22) Filed: Feb. 8, 2024

(65) Prior Publication Data

US 2024/0414313 A1 Dec. 12, 2024

(30) Foreign Application Priority Data

Jun. 8, 2023 (KR) ........................ 10-2023-0073604

(51) Int. Cl.
| | |
|---|---|
| *H04N 13/398* | (2018.01) |
| *G09G 3/18* | (2006.01) |
| *G09G 3/3291* | (2016.01) |
| *H04N 13/339* | (2018.01) |

(52) U.S. Cl.
CPC ............. *H04N 13/398* (2018.05); *G09G 3/18* (2013.01); *G09G 3/3291* (2013.01); *H04N 13/339* (2018.05); *G09G 2340/0407* (2013.01)

(58) Field of Classification Search
CPC .............. H04N 13/339; H04N 13/398; G09G 2340/0407; G09G 3/003; G09G 3/18; G09G 3/3291

USPC ........................................................... 348/51
See application file for complete search history.

(56) References Cited

U.S. PATENT DOCUMENTS

| | | | |
|---|---|---|---|
| 8,400,695 B2 | 3/2013 | Kroll et al. | |
| 2014/0160178 A1* | 6/2014 | Hong ................... | G09G 3/2007 |
| | | | 345/80 |
| 2015/0070408 A1* | 3/2015 | Lim ..................... | G09G 3/3233 |
| | | | 345/212 |
| 2018/0203231 A1* | 7/2018 | Glik ................... | G02B 27/0081 |

(Continued)

FOREIGN PATENT DOCUMENTS

| | | | | |
|---|---|---|---|---|
| CN | 108139626 A | * | 6/2018 | ........... G02B 26/005 |
| CN | 113823670 A | | 12/2021 | |

(Continued)

*Primary Examiner* — Behrooz M Senfi
(74) *Attorney, Agent, or Firm* — CANTOR COLBURN LLP

(57) ABSTRACT

A display device includes at least one spatial light modulator displaying an extended reality content image, a surface light source device disposed behind the at least one spatial light modulator and providing image display light of a first resolution to the spatial light modulator as background light, and at least one image transmission member forming a display path of the extended reality content image. The surface light source device includes an organic light-emitting display unit in which a plurality of sub-light-emitting pixels performing surface light emission is arranged and an emission driving circuit driving the each of the sub-light-emitting pixels of the organic light-emitting display unit.

20 Claims, 20 Drawing Sheets

(56) References Cited

U.S. PATENT DOCUMENTS

| | | | | |
|---|---|---|---|---|
| 2019/0294109 A1* | 9/2019 | Lee | ....................... | G03H 1/2294 |
| 2025/0008771 A1* | 1/2025 | Jang | ..................... | H10K 59/126 |

FOREIGN PATENT DOCUMENTS

| | | |
|---|---|---|
| CN | 115171543 A | 10/2022 |
| KR | 20220107242 A | 8/2022 |

* cited by examiner

UP : OSP1, OSP2, OSP3

UP : OSP1, OSP2, OSP3

UP : OSP1, OSP2, OSP3

UP : OSP1, OSP2, OSP3

DISPLAY DEVICE

This application claims priority to Korean Patent Application No. 10-2023-0073604, filed on Jun. 8, 2023, and all the benefits accruing therefrom under 35 U.S.C. § 119, the content of which in its entirety is herein incorporated by reference.

BACKGROUND

1. Field

The disclosure relates to a display device.

2. Description of the Related Art

Recently, as electronic devices and display devices that may implement virtual reality ("VR") are developed, technologies that may realize extended reality content image such as augmented reality ("AR"), mixed reality ("MR"), and extended holographic images are also being researched as a next step of virtual reality.

Unlike virtual reality that is based on a completely virtual world, augmented reality is a display technology that further increases the effect of reality by superimposing virtual objects or image information on a real-world environment. Stereoscopic imaging technology using a hologram method and the likes may fundamentally avoid fatigue that occurs in a conventional stereoscopic method in which stereoscopic images are seen using binocular disparity. Therefore, the stereoscopic imaging technology using the hologram method is drawing a lot of attention as a next-generation stereoscopic imaging technology that should be ultimately reached.

In the case of an extended reality content image such as a holographic image, since an actual image formed is directly seen with the eyes without using an optical illusion, a three dimensional ("3D") effect that is no different from seeing a real thing may be felt. Therefore, the holographic image has the advantage that even watching it for a long time does not cause fatigue.

An extended reality contents image display method such as a hologram essentially employs a spatial light modulator, and the performance of the spatial light modulator acts as an important factor that determines the performance and three-dimensional effect. Recently, a liquid crystal display panel is being employed as a spatial light modulator, and accordingly, the light-emitting structure of a light-emitting panel used as a background light source such as a backlight acts as an important factor in determining the display quality and viewing angle of an extended reality content image.

SUMMARY

Features of the disclosure provide a display device capable of modulating the arrangement structure of sub-light-emitting pixels and the surface light-emitting structure in a surface light source device which provides background light to a spatial light modulator and capable of displaying an extended reality content image such as a hologram using an ultra-low resolution surface light source.

Features of the disclosure also provide a display device capable of increasing the resolution and three dimensional ("3D") effect of an extended reality content image such as a hologram by modulating the resolution of a surface light source device.

However, features of the disclosure are not restricted to the one set forth herein. The above and other features of the disclosure will become more apparent to one of ordinary skill in the art to which the disclosure pertains by referencing the detailed description of the disclosure given below.

In an embodiment of the disclosure, a display device includes at least one spatial light modulator displaying an extended reality content image, a surface light source device disposed behind the at least one spatial light modulator and providing image display light of a first resolution to the spatial light modulator as background light, and at least one image transmission member forming a display path of the extended reality content image. The surface light source device includes an organic light-emitting display unit in which a plurality of sub-light-emitting pixels performing surface light emission is arranged and an emission driving circuit driving the each of the sub-light-emitting pixels of the organic light-emitting display unit.

In an embodiment, the emission driving circuit generates gate control signals and analog image signals for driving the plurality of sub-light-emitting pixels at a same timing in units of at least one frame, the gate control signals are supplied to a first gate driver in units of at least one frame, and the analog image signals are simultaneously supplied to the plurality of sub-light-emitting pixels.

In an embodiment, the plurality of sub-light-emitting pixels includes a plurality of pixel drivers simultaneously receiving the gate control signals, and a light-emitting element connected in parallel to the plurality of pixel drivers to emit light by the drive of the plurality of pixel drivers. The plurality of pixel drivers receive the gate control signals which are identical to each other and the analog image signals which are identical to each other at a same timing through the emission driving circuit and the first gate driver to cause the light-emitting element to emit light.

In an embodiment, each of the plurality of sub-light-emitting pixels includes a plurality of pixel drivers and a light-emitting element. Each of the light-emitting elements included in each of the plurality of sub-light-emitting pixels is formed in an organic light-emitting display surface of the surface light source device in at least any one of a sector shape, a triangular shape, a rhombus shape, a quadrangular shape, a circular shape, a semicircular shape and an elliptical shape or is formed in a combination of different shapes.

In an embodiment, the light-emitting elements included in each of the plurality of sub-light-emitting pixels are disposed in the circular shape in a plan view by surrounding a center of an organic light-emitting display unit in the circular shape or are disposed in the quadrangular shape in the plan view by surrounding the center of the organic light-emitting display surface in the quadrangular shape.

In an embodiment, the plurality of pixel drivers included in each of the plurality of sub-light-emitting pixels and the light-emitting element are connected in parallel structure. The plurality of pixel drivers included in each of the plurality of sub-light-emitting pixels partially overlaps each of the light-emitting element to be formed and arranged along at least any one side direction of the light-emitting element. The plurality of pixel drivers included in each of the plurality of sub-light-emitting pixels is supplied with the gate control signals which are identical to each other and the analog image signals which are identical to each other at a same time to drive each of the light-emitting element at a same time.

In an embodiment, three sub-light-emitting pixels respectively displaying red light, green light and blue light, among the plurality of sub-light-emitting pixels, constitute each unit light-emitting pixel that emits white light, the unit light-emitting pixels are alternately and repeatedly disposed on the organic light-emitting display surface, and a combination of the three sub-light-emitting pixels formed in the sector shape, the triangular shape and the rhombus shape in a plan view are disposed in each unit light-emitting pixel.

In an embodiment, a light-emitting element included in any one of the three sub-light-emitting pixels of each unit light-emitting pixel is formed in the triangular shape, and light-emitting elements included in remaining two of the three sub-light-emitting pixels are formed in the rhombus shape so that each unit light-emitting pixel comprised of a combination of the three sub-light-emitting pixels is formed and disposed in the sector shape.

In an embodiment, the three sub-light-emitting pixels of each unit light-emitting pixel are disposed in the circular shape in the plan view by surrounding a center of the organic light-emitting display surface in the circular shape and are formed to have a same planar area.

In an embodiment, the surface light source device further includes a first data processor extracting extended reality content image data of the first resolution from extended reality content image data input from an outside or converting the extended reality content image data input from the outside into the extended reality content image data of the first resolution, and the emission driving circuit converts the extended reality content image data of the first resolution into analog image signals and supplies the analog image signals to the plurality of sub-light-emitting pixels of the organic light-emitting display unit.

In an embodiment, the at least one spatial light modulator generates an extended reality content image of a second resolution by the image display light of the first resolution as the background light. The at least one image transmission member defines a display path of an extended reality content image of a third resolution in which the image display light of the first resolution and the extended reality content image of the second resolution are mixed.

In an embodiment, the spatial light modulator includes a liquid crystal image display unit displaying an extended reality content image of the second resolution in the front surface direction by, as the background light, the image display light of the first resolution provided from the surface light source device disposed behind the spatial light modulator, a second data processor extracting extended reality content image data of the second resolution from extended reality content image data input from the outside or converting the extended reality content image data input from the outside into the extended reality content image data of the second resolution, and a display driving circuit converting the extended reality content image data of the second resolution into analog image signals and supplies the analog image signals to liquid crystal pixels of the liquid crystal image display unit.

In an embodiment, the first resolution is a resolution set lower than the second resolution, and the third resolution is a mixed resolution of the first resolution and the second resolution.

In an embodiment, the surface light source device generates the image display light of the first resolution as a surface light source by converting extended reality content image data input from an outside into extended reality content image data of the first resolution, converting the extended reality content image data of the first resolution into analog image signals, and supplying the analog image signals to the plurality of sub-light-emitting pixels of the organic light-emitting display unit.

In an embodiment, the spatial light modulator converts the extended reality content image data input from the outside into extended reality content image data of a second resolution, converts the extended reality content image data of the second resolution into analog image signals and supplies the analog image signals to liquid crystal pixels of a liquid crystal image display unit, and generates an extended reality content image of the second resolution by, as the background light, the image display light of the first resolution provided from the surface light source device disposed behind the spatial light modulator. The at least one image transmission member forms a display path of an extended reality content image of a third resolution in which the image display light of the first resolution and the extended reality content image of the second resolution are mixed.

In an embodiment of the disclosure, a display device includes at least one spatial light modulator displaying an extended reality content image, a surface light source device disposed behind the at least one spatial light modulator and providing image display light of a first resolution to the spatial light modulator as background light, and at least one image transmission member forming a display path of the extended reality content image. The surface light source device includes an organic light-emitting display unit in which a plurality of sub-light-emitting pixels performing surface light emission is arranged and an emission driving circuit driving the plurality of sub-light-emitting pixels of the organic light-emitting display unit. The plurality of sub-light-emitting pixels includes a plurality of pixel drivers and one light-emitting element. The light-emitting element included in each of the plurality of sub-light-emitting pixels is formed in an organic light-emitting display surface of the surface light source device in at least any one of a sector shape, a triangular shape, a rhombus shape, a quadrangular shape, a circular shape, a semicircular shape and an elliptical shape or is formed in a combination of different shapes.

In an embodiment, the emission driving circuit generates gate control signals and analog image signals for driving the plurality of sub-light-emitting pixels at a same timing in units of at least one frame, the gate control signals are supplied to a first gate driver in units of at least one frame. The analog image signals are simultaneously supplied to the plurality of sub-light-emitting pixels.

In an embodiment, the plurality of pixel drivers simultaneously receives the gate control signals, the plurality of sub-light-emitting pixels further includes a light-emitting element connected in parallel to the plurality of pixel drivers to emit light by the drive of the plurality of pixel drivers, and the plurality of pixel drivers receive the gate control signals which are identical to each other and the analog image signals which are identical to each other at the same timing through the emission driving circuit and the first gate driver to cause the light-emitting element to emit light.

In an embodiment, the light-emitting elements included in each of the plurality of sub-light-emitting pixels are disposed in the circular shape in a plan view by surrounding a center of an organic light-emitting display surface in the circular shape or are disposed in the quadrangular shape in the plan view by surrounding the center of the organic light-emitting display surface in the quadrangular shape.

In an embodiment, three sub-light-emitting pixels respectively displaying red light, green light and blue light, among the plurality of sub-light-emitting pixels, constitute each unit light-emitting pixel that emits white light, the unit light-emitting pixels are alternately and repeatedly disposed on the organic light-emitting display surface, and a combination of the three sub-light-emitting pixels formed in the sector shape, the triangular shape and the rhombus shape in a plan view are disposed in each unit light-emitting pixel.

In a display device according to the disclosure, the light-emitting pixel arrangement structure and surface light-emitting structure of a surface light source device are simplified so that ultra-low resolution background light may be provided to a spatial light modulator. Therefore, it is possible to increase the efficiency of manufacturing the display device that displays an extended reality content image such as a hologram.

In addition, in a display device according to the disclosure, the resolution and 3D effect of extended reality content images such as holograms may be further increased by modulating the resolution of the surface light source device.

However, the effects of the disclosure are not restricted to the one set forth herein. The above and other effects of the disclosure will become more apparent to one of daily skill in the art to which the disclosure pertains by referencing the claims.

BRIEF DESCRIPTION OF THE DRAWINGS

These and/or other features will become apparent and more readily appreciated from the following description of the embodiments, taken in conjunction with the accompanying drawings in which.

DETAILED DESCRIPTION accompanying drawings, in which preferred embodiments of the disclosure are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the disclosure. Similarly, the second element could also be termed the first element.

Each of the features of the various embodiments of the disclosure may be combined or combined with each other, in part or in whole, and technically various interlocking and driving are possible. Each embodiment may be implemented independently of each other or may be implemented together in an association.

Hereinafter, illustrative embodiments will be described with reference to the accompanying drawings.

Figure 1:
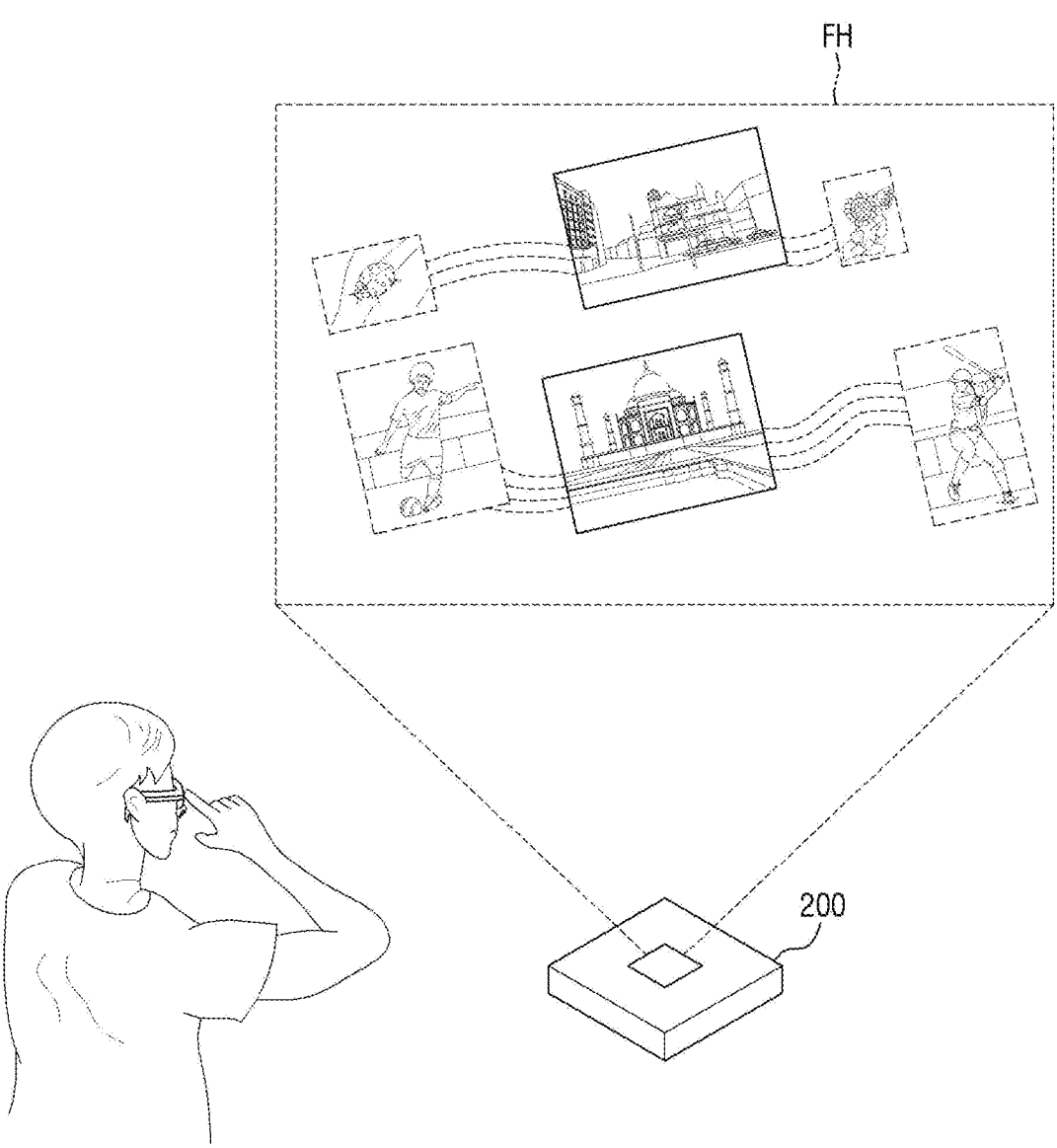
FIG. 1 illustrates an embodiment of utilizing a projector-type extended reality content image display device according to the disclosure.
Figure 2:
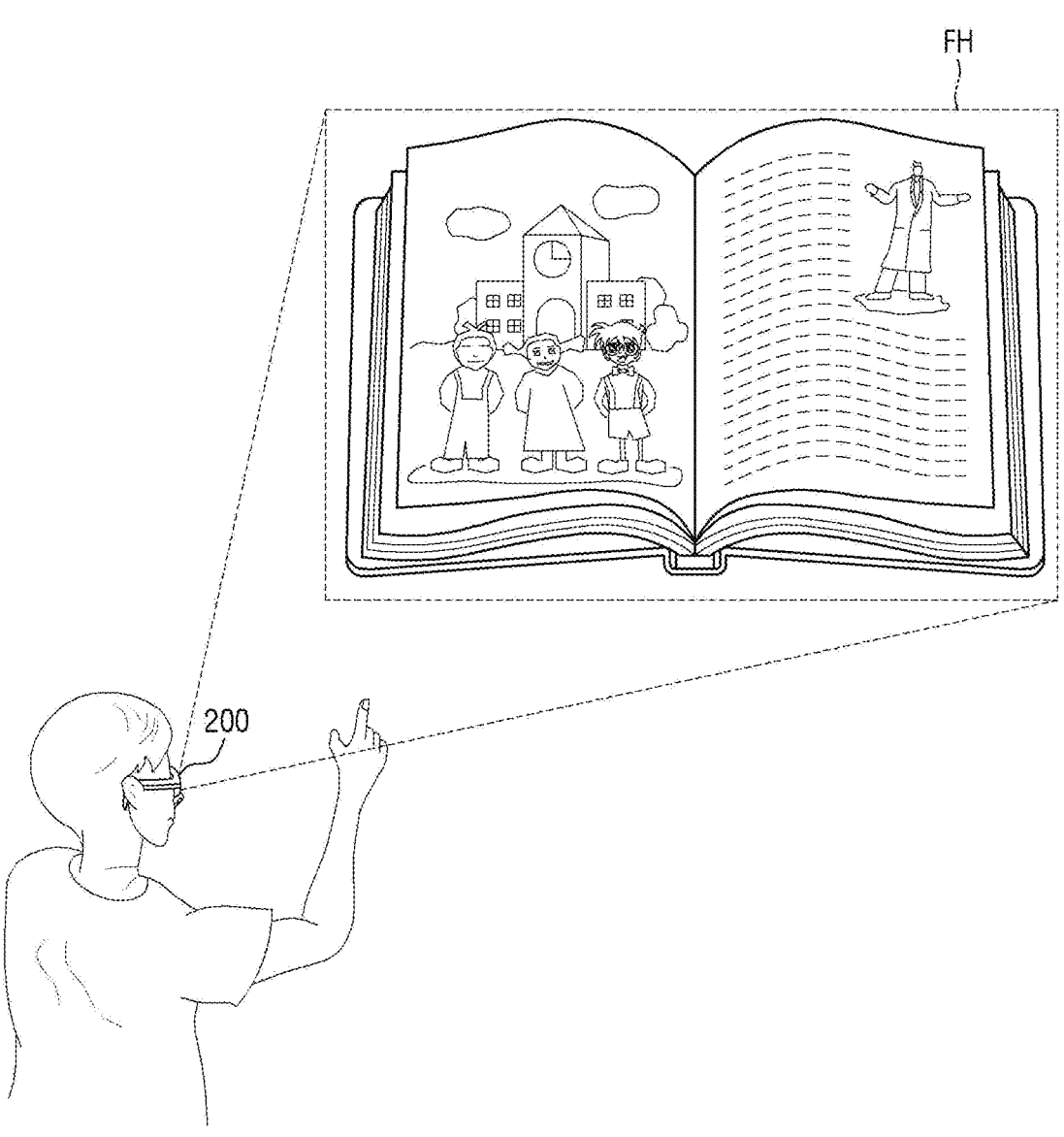
FIG. 2 illustrates an embodiment of utilizing a glasses-type extended reality content image display device according to the disclosure.

FIG. 1 illustrates an embodiment of utilizing a projector-type extended reality content image display device according to the disclosure. FIG. 2 illustrates an embodiment of utilizing a glasses-type extended reality content image display device according to the disclosure.

Referring to FIGS. 1 and 2, a display device 200 in an embodiment for displaying an extended reality content image such as a hologram may be formed as a projector type that may be easily carried by a user and may be disposed (e.g., mounted) or assembled in structures on a ceiling or a wall or in a predetermined space.

In addition, the display device 200 in the embodiment may be unitary with a glasses-type frame that may be easily carried and worn or taken off by a user or may be disposed (e.g., mounted) or assembled in the glasses-type frame.

In the disclosure, the display device 200 displays and provides an extended reality content image FH in a predetermined space through a three dimensional ("3D") lens or sheet, so that the extended reality content image FH such as a hologram may be recognized in a real space visible to a user's eyes. The extended reality content image FH may include two dimensional ("2D") or 3D extended reality image content, which is a combination of graphic images, camera-photographed images and text images, and sound content.

Figure 3:
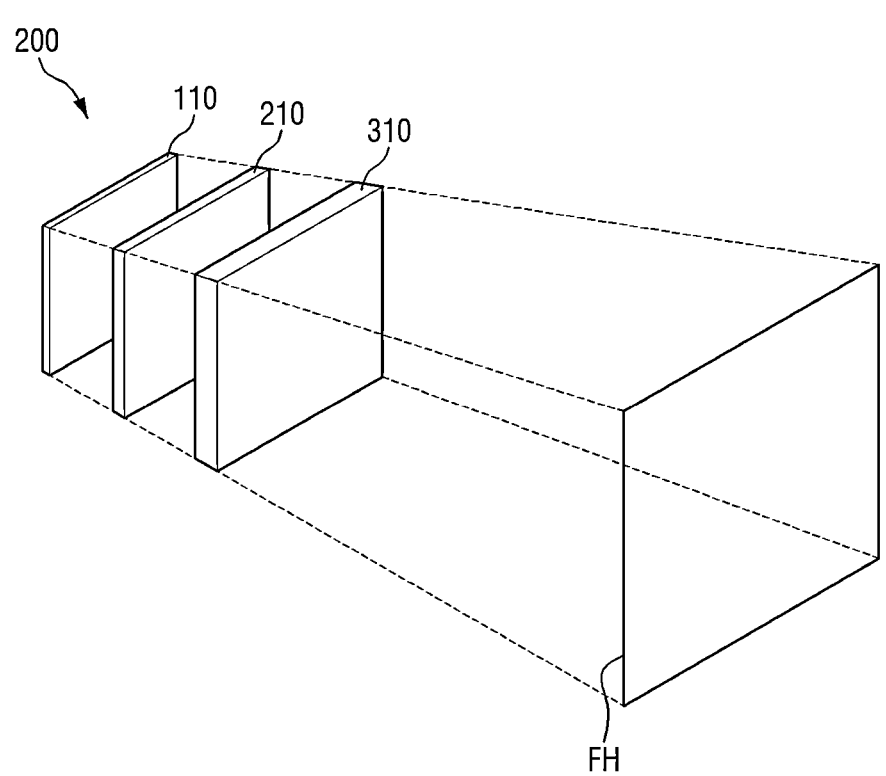
FIG. 3 is an exploded perspective view schematically illustrating an embodiment of the configuration of an extended reality content image display device.
Figure 4:
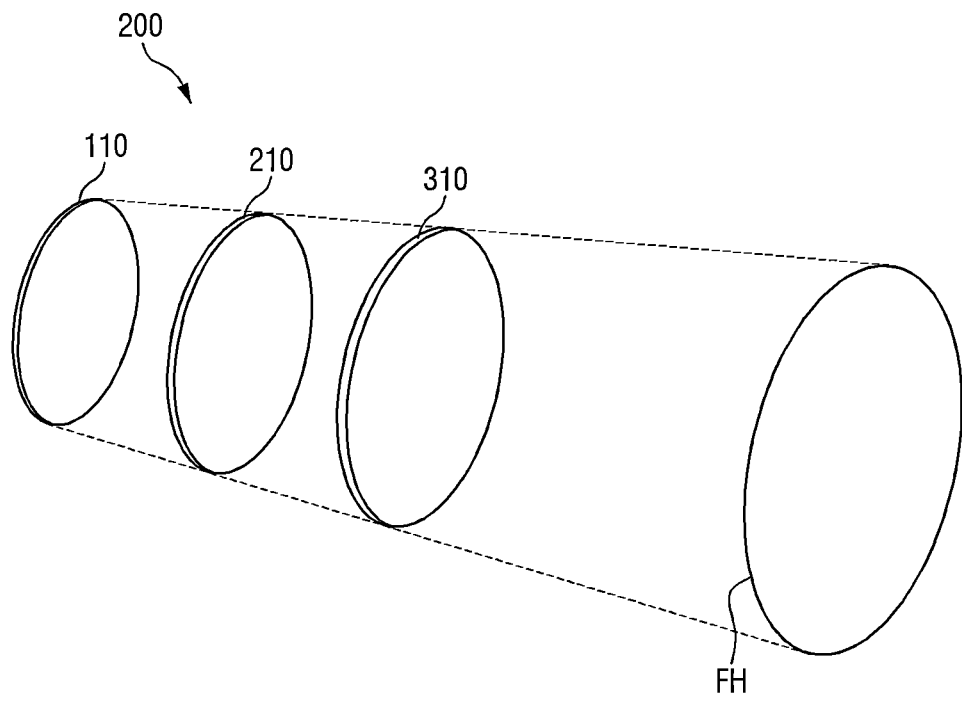
FIG. 4 is an exploded perspective view schematically illustrating an embodiment of the configuration of an extended reality content image display device.

FIG. 3 is an exploded perspective view schematically illustrating an embodiment of the configuration of an extended reality content image display device. FIG. 4 is an exploded perspective view schematically illustrating an embodiment of the configuration of an extended reality content image display device.

Referring to FIGS. 3 and 4, the display device 200 in the embodiment of FIG. 3 for displaying an extended reality content image such as a hologram may be shaped like a polygonal plane such as a square or rectangular plane or a quadrangular plate. The display device 200 in the embodiment of FIG. 2 may be shaped like a disk or a circular plate with a curved rim such as a circular or elliptical rim.

A display device 200 shaped like a quadrangular or circular plate includes at least one spatial light modulator 210, at least one surface light source device 110, and at least one image transmission member 310. Each of the spatial light modulator 210 and the surface light source device 110 may be shaped like a quadrangular or circular plate according to the planar shape of the display device 200.

The at least one surface light source device 110 is disposed behind the spatial light modulator 210 to provide background light as a backlight to a rear surface of the spatial light modulator 210.

The surface light source device 110 may include an organic light-emitting display device ("OLED"), an inorganic electroluminescent ("EL") display device, a quantum dot light-emitting display device ("QED"), a cathode ray tube ("CRT") display device, a micro-light-emitting diode ("LED") display device, or a nano-LED display device.

A case where an organic light-emitting display panel is applied as the surface light source device 110 will be described below as an example. However, the surface light source device 110 in an embodiment is not limited to an organic light-emitting display panel or device, and other display panels or devices listed above or known in the art may also be applied within the scope sharing the technical spirit.

The surface light source device 110 applied as an organic light-emitting display panel may be formed to have a different resolution from the at least one spatial light modulator 210. In particular, the surface light source device 110 may be formed to have a lower resolution than the at least one spatial light modulator 210.

The surface light source device 110 receives extended reality content image data from the outside and arranges the extended reality content image data according to a preset first resolution. Then, the extended reality content image data of the first resolution is converted into analog image signals and displayed on emission areas of an organic light-emitting display surface.

The extended reality content image display light of the first resolution displayed on the organic light-emitting display surface of the surface light source device 110, that is, on the emission areas of the surface light source device 110 is provided to the rear surface of the spatial light modulator 210 as a backlight, that is, background light.

The spatial light modulator 210 generates an extended reality content image according to the extended reality content image data from the outside and supplies the extended reality content image to the image transmission member 310 in front of the spatial light modulator 210, so that the extended reality content image is displayed in an image display direction and space of the image transmission member 310.

The spatial light modulator 210 may include a liquid crystal display device ("LCD") that displays an extended reality content image of a second resolution on a front surface by the background light of the first resolution provided from the surface light source device 110 disposed behind the spatial light modulator 210.

A case where a liquid crystal display panel is applied as the spatial light modulator 210 will be described below as an example. However, the disclosure is not limited to a liquid crystal display panel or device, and other display devices listed above or known in the art may also be applied within the scope sharing the technical spirit.

The spatial light modulator 210 applied as a liquid crystal display panel may be formed to have the same resolution as or a different resolution from the at least one surface light source device 110. However, in an embodiment, the spatial light modulator 210 may be formed to have a higher resolution than the at least one surface light source device 110.

The spatial light modulator 210 receives extended reality content image data input from the outside and arranges the extended reality content image data according to a preset second resolution. Then, the extended reality content image data of the second resolution is converted into analog image signals and displayed on an image display surface on which a plurality of pixels is arranged. The second resolution of the spatial light modulator 210 is set to be higher than the first resolution of the surface light source device 110. Accordingly, the spatial light modulator 210 generates an extended reality content image of the second resolution higher than the first resolution by the background light of the first resolution provided from the at least one surface light source device 110 behind the spatial light modulator 210 and displays the generated extended reality content image on its front surface.

The at least one image transmission member 310 transmits an extended reality content image of a third resolution, in which the background light of the first resolution and the extended reality content image of the second resolution are mixed, through a preset light path to direct and provide the extended reality content image in a preset image display direction. Specifically, the image transmission member 310 forms a display path (or light path) of the extended reality content image FH so that the extended reality content image FH of the third resolution may be displayed on a preset space or display surface.

The image transmission member 310 may include at least one optical member from among an optical waveguide (e.g., a prism), a diffusion lens, and a focusing lens. Therefore, the extended reality content image FH displayed through the at least one spatial light modulator 210 is directed to a predetermined space through the optical waveguide, the diffusion lens and at least one focusing lens and recognized as the extended reality content image FH of the third resolution in real space. The extended reality content image FH displayed as a hologram type by the image transmission member 310 may include 2D or 3D extended reality image content, which is a combination of graphic images, camera-photographed images and text images, and sound content.

Figure 5:
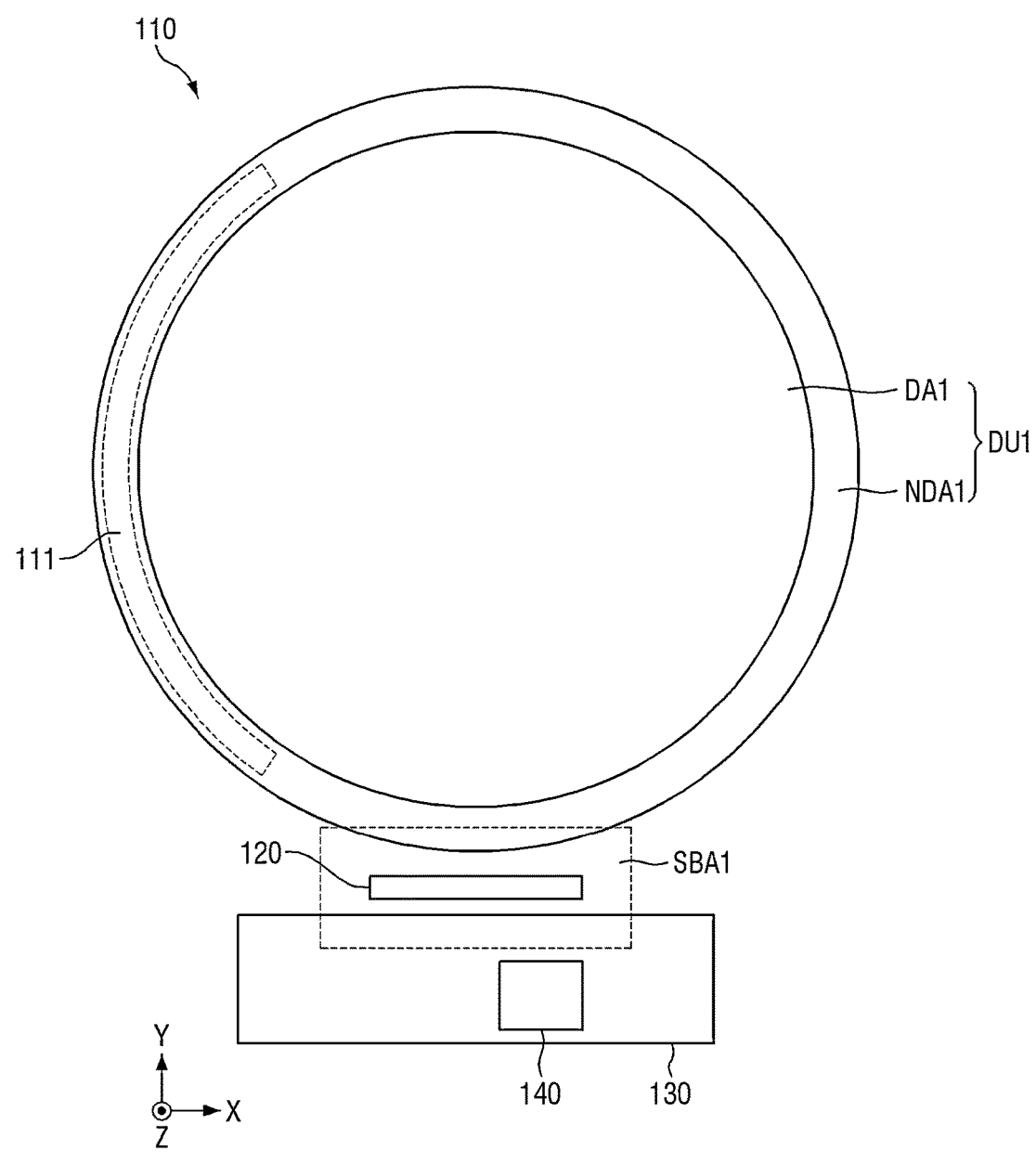
FIG. 5 is a detailed plan view of a surface light source device illustrated in FIG. 4.

FIG. 5 is a detailed plan view of a surface light source device illustrated in FIG. 4.

Referring to FIG. 5, the at least one surface light source device 110 is formed to serve as a light source that provides background light to the rear surface of the at least one spatial light modulator 210.

The surface light source device 110 may have a quadrangular shape such as a rectangular shape or a square shape, a circular shape, or an elliptical shape in a plan view. In an embodiment, when the spatial light modulator 210 is formed in a circular shape in a plan view, the surface light source device 110 may also have a circular shape corresponding to the planar circular shape of the spatial light modulator 210. However, the disclosure is not limited thereto, and the surface light source device 110 and the spatial light modulator 210 may also be formed in a rectangular shape with long sides disposed in a horizontal direction and short sides disposed in a vertical direction.

Referring to FIG. 5, the at least one surface light source device 110 includes a surface light-emitting unit DU1 which displays background light as a surface light source, an emission driving circuit 120 which drives sub-light-emitting pixels of the surface light-emitting unit DU1, and a first data processor 140 which supplies extended reality content image data to the emission driving circuit 120.

Specifically, the at least one surface light source device 110 includes the surface light-emitting unit DU1 which displays background light as a surface light source. Here, the surface light-emitting unit DU1 may include a plurality of sub-light-emitting pixels and may emit background light, which is a surface light source, through the sub-light-emitting pixels. The sub-light-emitting pixels in the surface light-emitting unit DU1 are formed and arranged to correspond to the preset first resolution.

The first data processor 140 extracts extended reality content image data of the first resolution from extended reality content image data input from the outside, or convert the extended reality content image data input from the outside into the extended reality content image data of the preset first resolution. Then, the first data processor 140 transmits the extended reality content image data of the first resolution to the emission driving circuit 120 of the surface light source device 110.

The emission driving circuit 120 may output data signals and voltages for driving the sub-light-emitting pixels of the surface light-emitting unit DU1. Specifically, the emission driving circuit 120 receives extended reality content image data from the first data processor 140 such as a graphic card and arranges the extended reality content image data according to the preset first resolution. Then, the extended reality content image data of the first resolution is converted into analog image signals and supplied to the sub-light-emitting pixels arranged on an organic light-emitting display surface DA1 of the surface light-emitting unit DU1.

Figure 6:
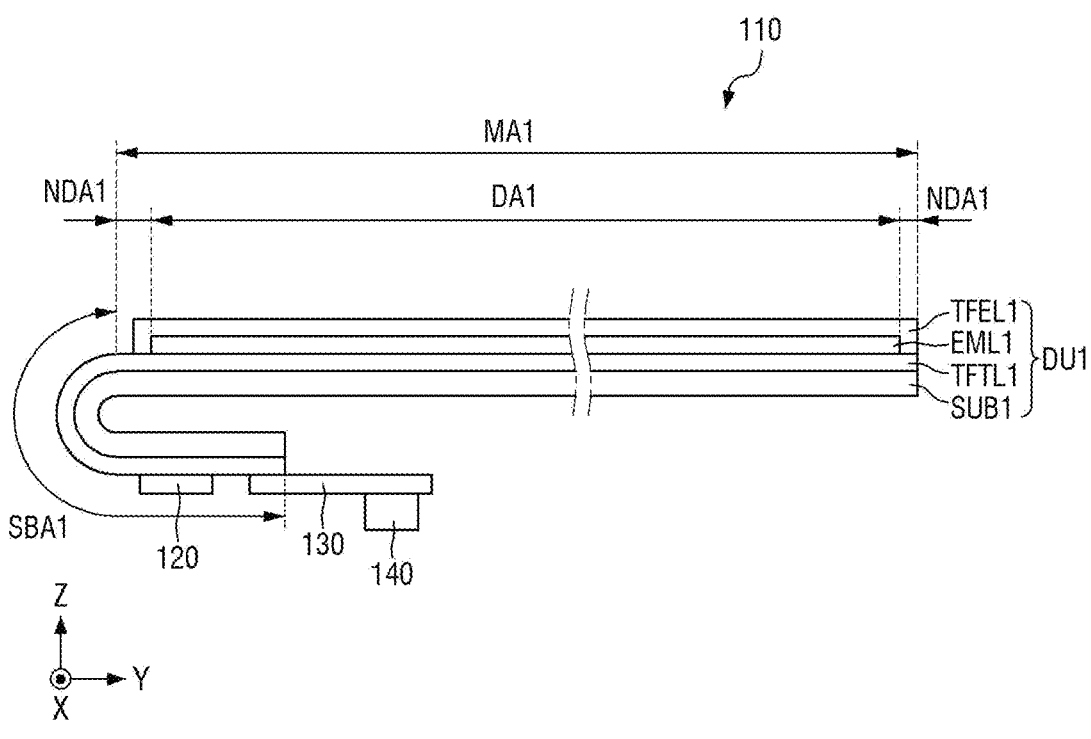
FIG. 6 is a side cross-sectional view illustrating the cross-sectional structure of the surface light source device illustrated in FIG. 4.

FIG. 6 is a side cross-sectional view illustrating the cross-sectional structure of the surface light source device illustrated in FIG. 4.

Referring to FIGS. 5 and 6, the surface light-emitting unit DU1 may be divided into a first main area MA1 and a first sub-area SBA1. The first main area MA1 may include the organic light-emitting display surface DA1 on which a plurality of sub-light-emitting pixels performing surface emission is arranged and a first non-display area NDA1 disposed around the organic light-emitting display surface DA1.

Light emitted from respective emission areas or opening areas of the sub-light-emitting pixels may be displayed on the organic light-emitting display surface DA1 as background light. To this end, the sub-light-emitting pixels of the organic light-emitting display surface DA1 may include pixel drivers including switching elements, a pixel defining layer defining the emission areas or the opening areas, and self-light-emitting elements.

The first non-display area NDA1 may be an area outside the organic light-emitting display surface DA1. The first non-display area NDA1 may be defined as an edge area of the first main area MA1. The first non-display area NDA1 may include a gate driver 111 supplying gate signals to gate lines and fan-out lines (not illustrated) connecting the emission driving circuit 120 and the organic light-emitting display surface DA1.

The first sub-area SBA1 may extend from a side of the first main area MA1. The first sub-area SBA1 may include a flexible material that may be bent, folded, or rolled. In an embodiment, when the first sub-area SBA1 is bent, it may be overlapped by the first main area MA1 in a thickness direction (Z-axis direction). The first sub-area SBA1 may include the emission driving circuit 120 and a pad unit connected to a first circuit board 130. Optionally, the first sub-area SBA1 may be omitted, and the emission driving circuit 120 and the pad unit may be disposed in the first non-display area NDA1.

At least one emission driving circuit 120 may be formed as an integrated circuit and disposed (e.g., mounted) in the first non-display area NDA1 by a chip on glass ("COG") method, a chip on plastic ("COP") method, or an ultrasonic bonding method. In an embodiment, the emission driving circuit 120 may be disposed in the first sub-area SBA1 and may be overlapped by the first main area MA1 in the thickness direction (Z-axis direction) by the bending of the first sub-area SBA1, for example. In another embodiment, the emission driving circuit 120 may be disposed (e.g., mounted) on the first circuit board 130.

The first circuit board 130 may be attached onto the pad unit of the first non-display area NDA1 using an anisotropic conductive film ("ACF"). Lead lines of the first circuit board 130 may be electrically connected to the pad unit of the first non-display area NDA1. The first circuit board 130 may be a flexible printed circuit board, a printed circuit board, or a flexible film such as a chip on film.

A first substrate SUB1 of the surface light-emitting unit DU1 illustrated in FIG. 6 may be a base substrate or a base member. The first substrate SUB1 may be a flexible substrate that may be bent, folded, or rolled. In an embodiment, the first substrate SUB1 may include a glass material or a metal material, for example. However, the disclosure is not limited thereto. In another embodiment, the first substrate SUB1 may include polymer resin such as polyimide ("PI").

A first thin-film transistor layer TFTL1 may be disposed on the first substrate SUB1. The first thin-film transistor layer TFTL1 may include a plurality of thin-film transistors constituting pixel drivers of sub-light-emitting pixels. The first thin-film transistor layer TFTL1 may further include gate lines, data lines, power lines, gate control lines, fan-out lines connecting the emission driving circuit 120 and the data lines, and lead lines connecting the emission driving circuit 120 and the pad unit. When the first gate driver 111 is formed on a side of the first non-display area NDA1 of the surface light-emitting unit DU1, the first gate driver 111 may also include thin-film transistors.

The first thin-film transistor layer TFTL1 may be disposed on the organic light-emitting display surface DA1, the first non-display area NDA1, and the first sub-area SBA1. The thin-film transistors of the pixels, the gate lines, the data lines, and the power lines of the first thin-film transistor layer TFTL1 may be disposed on the organic light-emitting display surface DA1. The gate control lines and the fan-out lines of the first thin-film transistor layer TFTL1 may be disposed in the first non-display area NDA1. The lead lines of the first thin-film transistor layer TFTL1 may be disposed in the first sub-area SBA1.

A first light-emitting element layer EML1 may be disposed on the first thin-film transistor layer TFTL1. The first light-emitting element layer EML1 may include a plurality of light-emitting elements, each including a first electrode, a light-emitting layer and a second electrode sequentially stacked to emit light, and a pixel defining layer defining the pixels. The light-emitting elements of the first light-emitting element layer EML1 may be disposed on the organic light-emitting display surface DA1.

A first encapsulation layer TFEL1 may cover upper and side surfaces of the first light-emitting element layer EML1 and may protect the first light-emitting element layer EML1. The first encapsulation layer TFEL1 may include at least one inorganic layer and at least one organic layer to encapsulate the first light-emitting element layer EML1.

Figure 7:
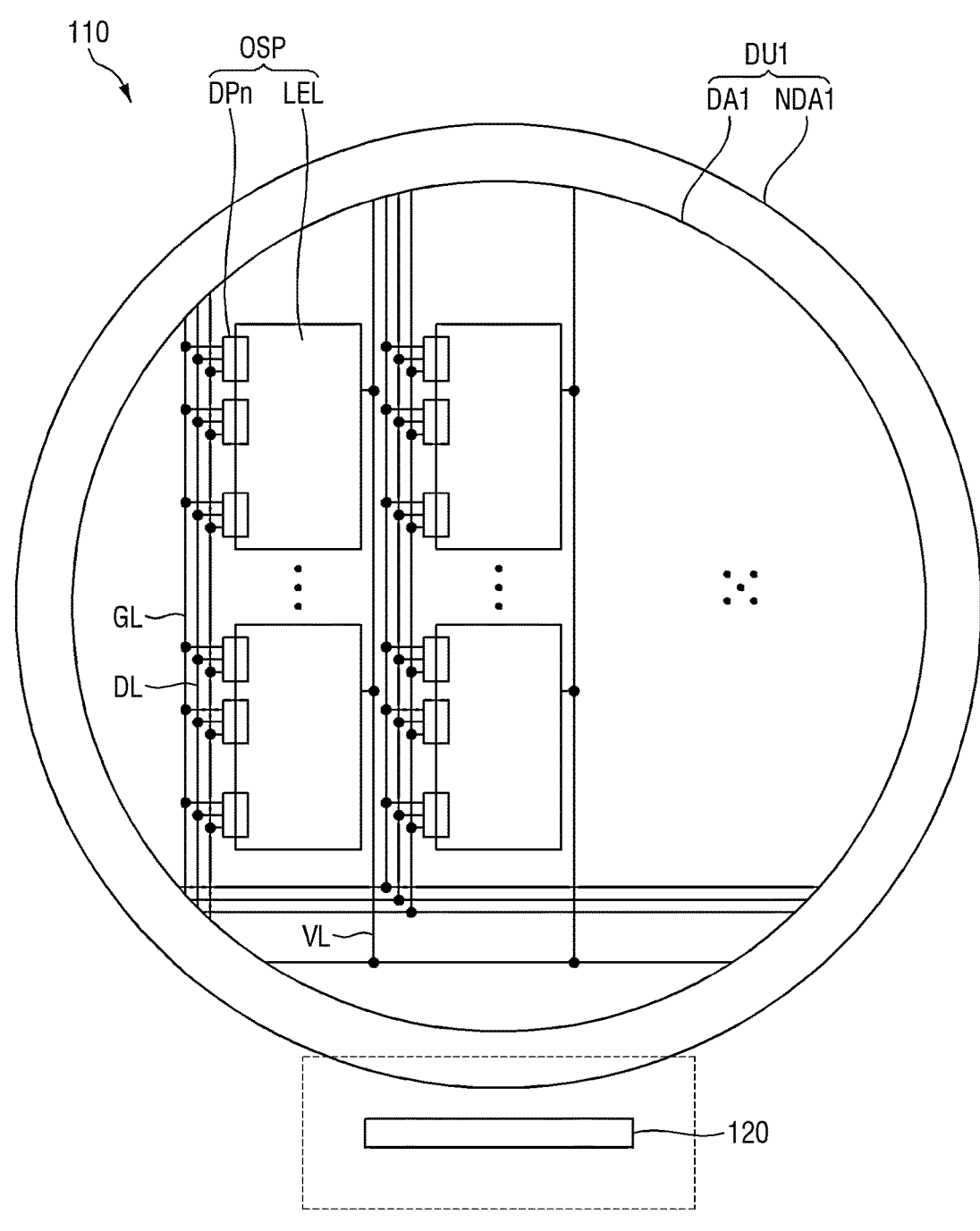
FIG. 7 is a plan view schematically illustrating the structure of an organic light-emitting display surface of the surface light source device illustrated in FIGS. 5 and 6.

FIG. 7 is a plan view schematically illustrating the structure of an organic light-emitting display surface of the surface light source device illustrated in FIGS. 5 and 6.

Referring to FIG. 7, the organic light-emitting display surface DA1 of the surface light-emitting unit DU1 is an area that displays background light through surface light emission and may be defined as a central area of the surface light-emitting unit DU1. The organic light-emitting display surface DA1 may include a plurality of light-emitting pixels OSP, gate lines GL, data lines DL, and power lines VL. Each of the light-emitting pixels OSP may be defined as a minimum unit that emits light.

The gate lines GL may simultaneously supply gate signals received from the first gate driver 111 to the light-emitting pixels OSP. The gate lines GL may extend in X-axis and Y-axis directions according to the arrangement direction and planar shape of the light-emitting pixels OSP and may be disposed in the X-axis or Y-axis direction around the light-emitting pixels OSP.

The data lines DL may supply image data voltages received from the emission driving circuit 120 to the light-emitting pixels OSP. The data lines DL may extend in the X-axis and Y-axis directions according to the arrangement direction and planar shape of the light-emitting pixels OSP and may be disposed in the X-axis or Y-axis direction around the light-emitting pixels OSP.

The power lines VL may supply each power supply voltage received from the emission driving circuit 120 to the light-emitting pixels OSP. Here, the power supply voltages may be at least one of a high-potential driving voltage, a low-potential ground voltage, and a reference voltage. The power lines VL may extend in the X-axis and Y-axis directions according to the arrangement direction and planar shape of the light-emitting pixels OSP and may be disposed in the X-axis or Y-axis direction around the light-emitting pixels OSP.

Figure 16:
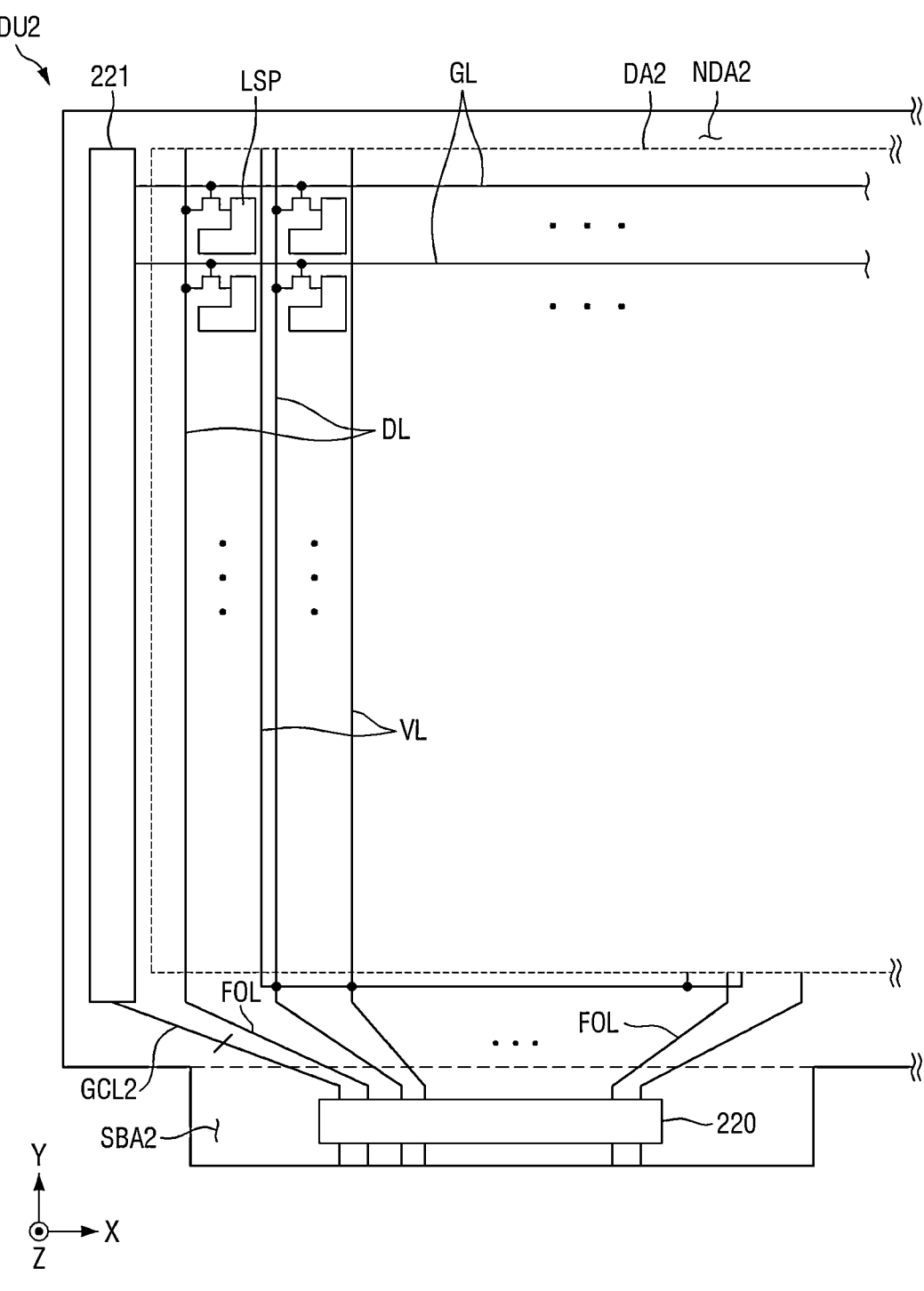
FIG. 16 is a plan view schematically illustrating the structure of the liquid crystal image display unit of the spatial light modulator illustrated in FIG. 15A.

The first non-display area NDA1 may include the first gate driver 111, fan-out lines FOL (refer to FIG. 16), and gate control lines GCL (refer to FIG. 16). The first gate driver 111 may generate gate signals based on a gate control signal in units of at least one frame period and may simultaneously supply the gate signals to the gate lines GL in units of at least one frame period.

The fan-out lines FOL may extend from the emission driving circuit 120 to the organic light-emitting display surface DA1. The fan-out lines FOL may simultaneously supply data voltages received from the emission driving circuit 120 to the data lines DL in units of at least one frame period.

The first gate control lines GCL1 may extend from the emission driving circuit 120 to the first gate driver 111. The first gate control lines GCL1 may supply gate control signals received from the emission driving circuit 120 to the first gate driver 111.

The emission driving circuit 120 may output control signals (e.g., the same gate control signals) and analog image signals for simultaneously driving the light-emitting pixels OSP to the fan-out lines FOL. The emission driving circuit 120 may simultaneously supply the analog image signals to the data lines DL through the fan-out lines FOL. The analog image signals may be supplied to the light-emitting pixels OSP and may determine luminances of the light-emitting pixels OSP. The emission driving circuit 120 supplies gate control signals to the first gate driver 111 through the gate control lines GCL.

Figure 8:
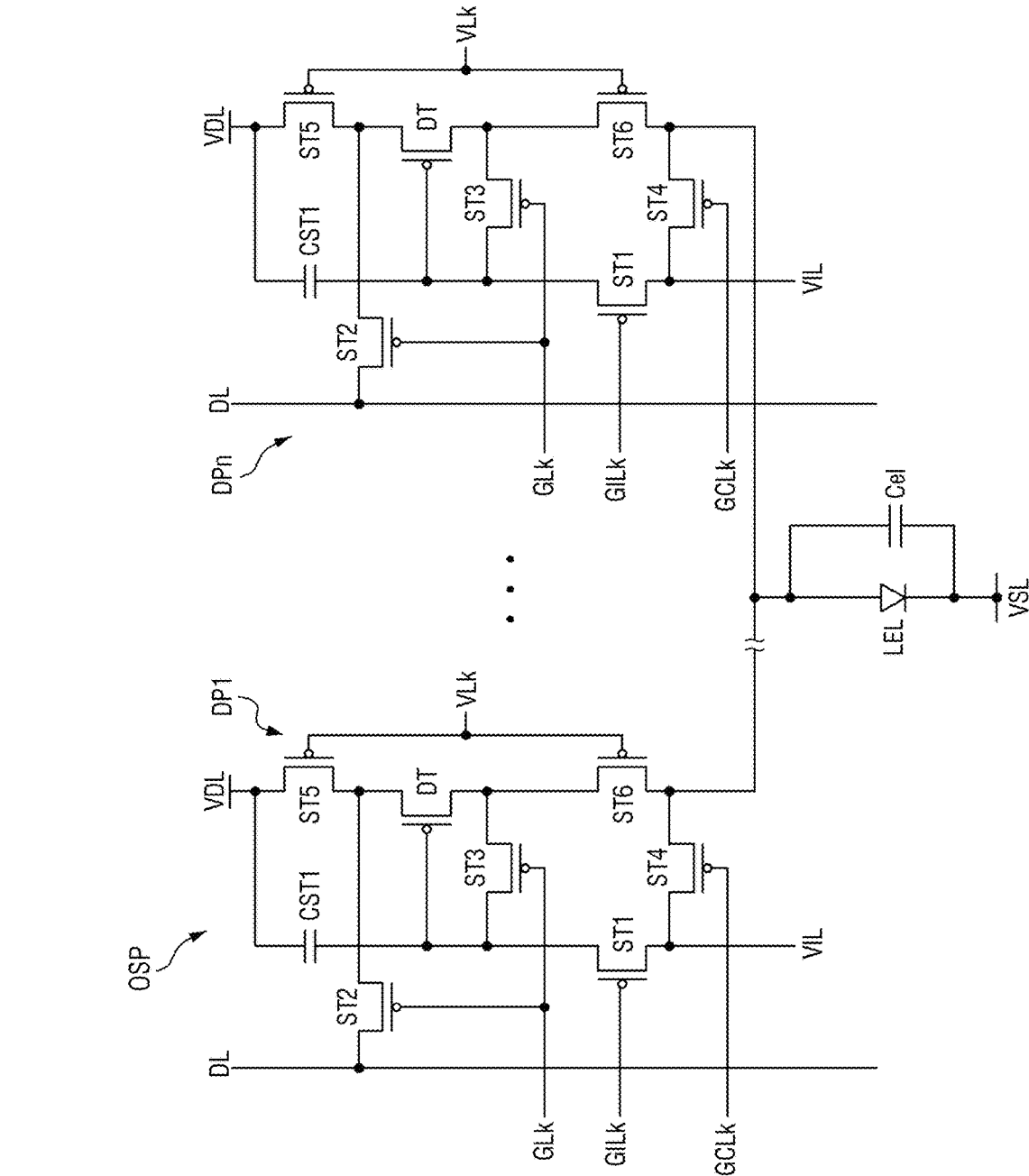
FIG. 8 is a circuit diagram illustrating an embodiment of the circuit structure of a light-emitting pixel according to the disclosure.

FIG. 8 is a circuit diagram illustrating an embodiment of the circuit structure of a light-emitting pixel according to the disclosure.

Referring to FIG. 8 together with FIG. 7, each of the light-emitting pixels OSP arranged on the organic light-emitting display surface DA1 includes a plurality of pixel drivers DP1 through DPn (n is a natural number) and a light-emitting element LEL.

The light-emitting element LEL is connected in parallel to the pixel drivers DP1 through DPn and includes light-emitting element LEL that emits light by the drive of the pixel drivers DP1 through DPn.

The pixel drivers DP1 through DPn receive the same control signals (e.g., the same gate control signals) and analog image signal through the emission driving circuit 120 and the first gate driver 111 and drive the light-emitting element LEL connected in parallel thereto at the same driving timing in units of at least one frame.

Specifically, the light-emitting pixels OSP are disposed at ultra-low resolution. In an embodiment, the light-emitting pixels OSP may be formed and disposed on the organic light-emitting display surface DA1 in units of at least three, and the number of light-emitting pixels OSP disposed on the organic light-emitting display surface DA1 may be a multiple of three (e.g., 3, 6, 9, 12, 15, . . . ).

The planar area of the light-emitting element LEL of each light-emitting pixel OSP is inversely proportional to the number of resolutions. That is, the planar area of each light-emitting element LEL may be inversely proportional to the resolution at which the light-emitting elements LEL are disposed. Since a resistance-capacitance ("RC") value of each light-emitting element LEL increases as the planar area of each light-emitting element LEL increases, a plurality of pixel drivers DP1 through DPn are connected to each light-emitting element LEL to prevent a reduction in the amount of light emitted from each light-emitting element LEL. Accordingly, the pixel drivers DP1 through DPn of each light-emitting pixel OSP receive control signals and a data voltage at the same timing and drive the light-emitting element LEL at the same driving timing.

Referring to FIG. 8, each of the pixel drivers DP1 through DPn of each light-emitting pixel OSP may be connected to a $k^{th}$ display initialization line GILk, a $k^{th}$ display scan line GLk, a $k^{th}$ display control line GCLk, and a $k^{th}$ emission control line VLk.

In addition, each of the pixel drivers DP1 through DPn may be connected to a first driving voltage line VDL to which a high-potential first driving voltage is supplied, a second driving voltage line VSL to which a low-potential second driving voltage is supplied, and a third driving voltage line VIL to which a high-potential third driving voltage is supplied. The alphabets k and n used instead of numbers will hereinafter be defined as positive integers excluding zero.

Each of the pixel drivers DP1 through DPn of each light-emitting pixel OSP may include a driving transistor DT, switch elements, and a capacitor CST1. The switch elements include first through sixth transistors ST1 through ST6.

The driving transistor DT may include a gate electrode, a first electrode, and a second electrode. The driving transistor DT controls a drain-source current Ids (hereinafter, also referred to as a "driving current") flowing between the first electrode and the second electrode according to a data voltage applied to the gate electrode. The driving current Ids flowing through a channel of the driving transistor DT is proportional to the square of a difference between a voltage Vgs between the first electrode and the gate electrode of the driving transistor DT and a threshold voltage as shown in Equation 1.

$$Ids = k' \times (Vsg - Vth)^2, \qquad (1)$$

where k' is a proportional coefficient determined by the structure and physical characteristics of a driving transistor, Vsg is a voltage between the first electrode and the gate electrode of the driving transistor, and Vth is a threshold voltage of the driving transistor.

The light-emitting element LEL emits light according to the driving currents Ids simultaneously supplied through the pixel drivers DP1 through DPn. As the driving currents Ids supplied in parallel from the pixel drivers DP1 through DPn increase, the amount of light emitted from the light-emitting element LEL may increase.

The light-emitting element LEL may be an organic light-emitting diode including an organic light-emitting layer disposed between an anode and a cathode. In an alternative embodiment, the light-emitting element LEL may be an inorganic light-emitting element including an inorganic semiconductor disposed between the anode and the cathode. In an alternative embodiment, the light-emitting element LEL may be a quantum dot light-emitting element including a quantum dot light-emitting layer disposed between the anode and the cathode. In an alternative embodiment, the light-emitting element LEL may be a micro-light-emitting element including a micro-light-emitting diode disposed between the anode and the cathode.

The anode of each light-emitting element LEL may be connected to a first electrode of the fourth transistor ST4 and a second electrode of the sixth transistor ST6 of each of the pixel drivers DP1 through DPn, and the cathode may be connected to the second driving voltage line VSL. A parasitic capacitance Cel may be formed between the anode and the cathode of the light-emitting element LEL.

The first transistor ST1 is turned on by an initialization scan signal of the k$^{th}$ display initialization line GILk to connect the gate electrode of the driving transistor DT to the third driving voltage line VIL. Accordingly, the third driving voltage of the third driving voltage line VIL may be applied to the gate electrode of the driving transistor DT. The first transistor ST1 may include a gate electrode connected to the k$^{th}$ display initialization line GILk, a first electrode connected to the gate electrode of the driving transistor DT, and a second electrode connected to the third driving voltage line VIL.

The second transistor ST2 is turned on by a display scan signal of the k$^{th}$ display scan line GLk to connect the first electrode of the driving transistor DT to a data line DL. Accordingly, a data voltage of the data line DL may be applied to the first electrode of the driving transistor DT. The second transistor ST2 may include a gate electrode connected to the k$^{th}$ display scan line GLk, a first electrode connected to the first electrode of the driving transistor DT, and a second electrode connected to the data line DL.

The third transistor ST3 is turned on by the display scan signal of the k$^{th}$ display scan line GLk to connect the gate electrode and the second electrode of the driving transistor DT. When the gate electrode and the second electrode of the driving transistor DT are connected, the driving transistor DT operates as a diode. The third transistor ST3 may include a gate electrode connected to the k$^{th}$ display scan line GLk, a first electrode connected to the second electrode of the driving transistor DT, and a second electrode connected to the gate electrode of the driving transistor DT.

The fourth transistor ST4 is turned on by a display control signal of the k$^{th}$ display control line GCLk to connect the anode of the light-emitting element LEL to the third driving voltage line VIL. The third driving voltage of the third driving voltage line VIL may be applied to the anode of the light-emitting element LEL. The fourth transistor ST4 may include a gate electrode connected to the k$^{th}$ display control line GCLk, the first electrode connected to the anode of the light-emitting element LEL, and a second electrode connected to the third driving voltage line VIL.

The fifth transistor ST5 is turned on by an emission signal of the k$^{th}$ emission control line VLk to connect the first electrode of the driving transistor DT to the first driving voltage line VDL. The fifth transistor ST5 may include a gate electrode connected to the k$^{th}$ emission control line VLk, a first electrode connected to the first driving voltage line VDL, and a second electrode connected to the first electrode of the driving transistor DT.

The sixth transistor ST6 is disposed between the second electrode of the driving transistor DT and the anode of the light-emitting element LEL. The sixth transistor ST6 is turned on by the emission control signal of the k$^{th}$ emission control line VLK to connect the second electrode of the driving transistor DT to the anode of the light-emitting element LEL. The sixth transistor ST6 may include a gate electrode connected to the k$^{th}$ emission control line VLk, a first electrode connected to the second electrode of the driving transistor DT, and the second electrode connected to the anode of the light-emitting element LEL.

When both the fifth transistor ST5 and the sixth transistor ST6 are turned on, the driving current Ids of the driving transistor DT according to the data voltage applied to the gate electrode of the driving transistor DT may flow to the light-emitting element LEL.

The capacitor CST1 is formed between the gate electrode of the driving transistor DT and the first driving voltage line VDL. A first capacitor electrode of the capacitor CST1 may be connected to the gate electrode of the driving transistor DT, and a second capacitor electrode may be connected to the first driving voltage line VDL.

When the first electrode of each of the first through sixth transistors ST1 through ST6 and the driving transistor DT is a source electrode, the second electrode may be a drain electrode. In an alternative embodiment, when the first electrode of each of the first through sixth transistors ST1 through ST6 and the driving transistor DT is a drain electrode, the second electrode may be a source electrode.

An active layer of each of the first through sixth transistors ST1 through ST6 and the driving transistor DT may include or consist of any one of polysilicon, amorphous silicon, and an oxide semiconductor. Although a case where the first through sixth transistors ST1 through ST6 and the driving transistor DT are formed as P-type metal oxide semiconductor field effect transistors ("MOSFETs") is mainly described in FIG. 8, the disclosure is not limited thereto. In an embodiment, the first through sixth transistors ST1 through ST6 and the driving transistor DT may also be formed as N-type MOSFETs, for example. In an alternative embodiment, at least one of the first through sixth transistors ST1 through ST6 may be formed as an N-type MOSFET.

Figure 9:
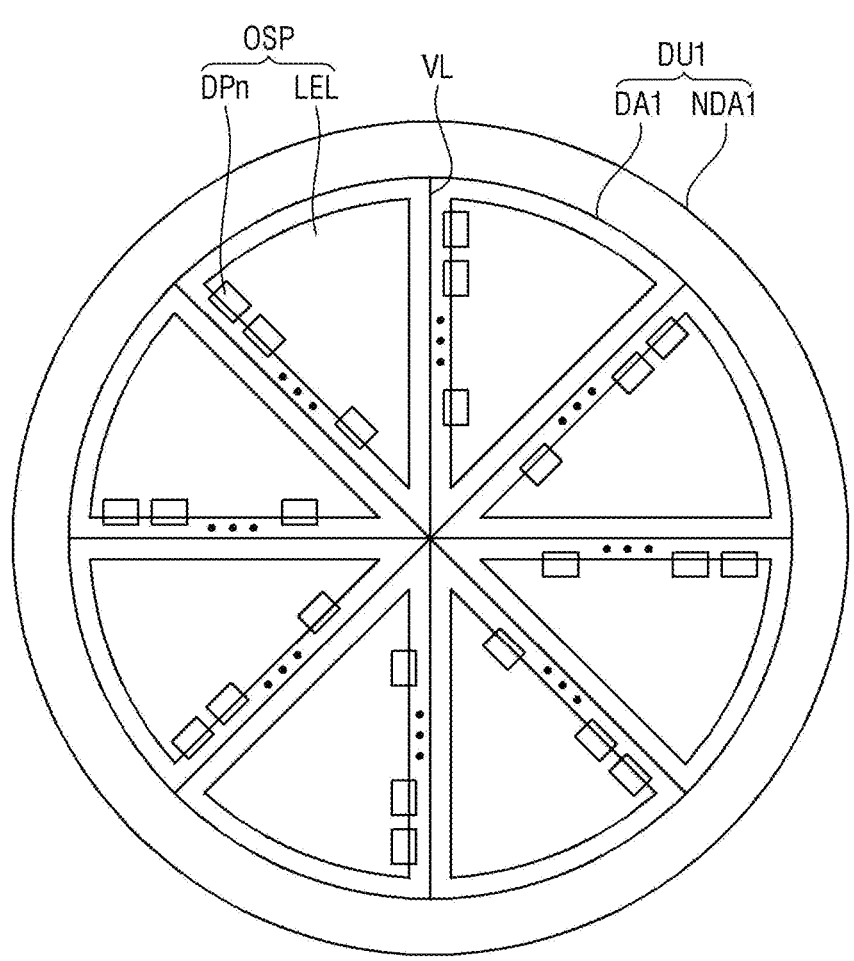
FIG. 9 is a plan view of a first embodiment illustrating the arrangement structure of sub-light-emitting pixels of a surface light-emitting unit illustrated in FIG. 7.

FIG. 9 is a plan view of a first embodiment illustrating the arrangement structure of light-emitting pixels of a surface light-emitting unit illustrated in FIG. 7. In addition, FIG. 10 is a plan view of a second embodiment illustrating the arrangement structure of the light-emitting pixels of the surface light-emitting unit illustrated in FIG. 7.

Figure 10:
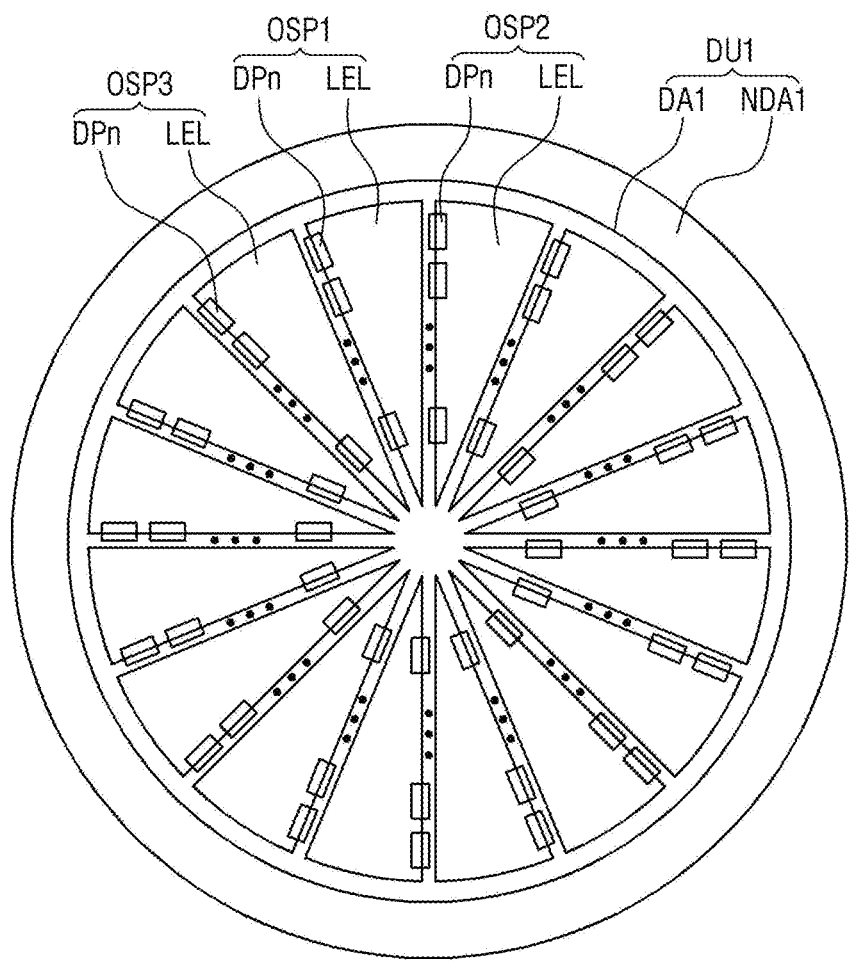
FIG. 10 is a plan view of a second embodiment illustrating the arrangement structure of the sub-light-emitting pixels of the surface light-emitting unit illustrated in FIG. 7.

Referring to FIGS. 9 and 10, the organic light-emitting display surface DA1 may be formed in a circular shape in a plan view according to the planar shape of the surface light source device 110. Light emitted from the light-emitting element LEL of each light-emitting pixel OSP may be displayed as background light on the organic light-emitting display surface DA1. The light-emitting element LEL of each of the light-emitting pixels OSP emits light in response to driving currents supplied in parallel from a plurality of pixel drivers DP1 through DPn.

The light-emitting pixels OSP may be formed and disposed on the organic light-emitting display surface DA1 in units of at least three. Accordingly, the number of light-emitting elements LEL disposed on the organic light-emitting display surface DA1 may be a multiple of three (e.g., 3, 6, 9, 12, 15, 18 . . . ).

On the organic light-emitting display surface DA1 formed in a circular shape in a plan view, the light-emitting elements LEL may be formed in at least any one of a sector shape, a triangular shape, a rhombus shape, a circular shape, a semicircular shape and an elliptical shape in a plan view or may be formed in a combination of each shape.

Referring to FIGS. 9 and 10, the light-emitting elements LEL formed in a sector shape may be disposed in a circular shape in a plan view by surrounding a center of the organic light-emitting display surface DA1 in a circular shape. The planar area of each light-emitting element LEL is inversely proportional to the number of resolutions. That is, as illustrated in FIG. 9, the planar area of each light-emitting element LEL may be larger as the number of light-emitting elements LEL is smaller and the resolution is lower. Conversely, as illustrated in FIG. 10, the planar area of each light-emitting element LEL may be smaller as the number of light-emitting elements LEL is larger and the resolution is higher.

The power lines VL, that is, the first through third driving voltage lines VDL, VSL and VIL supplying power voltages to the pixel drivers DP1 through DPn and the light-emitting elements LEL may be disposed and formed between and around the light-emitting elements LEL.

As described above, since the RC value of each light-emitting element LEL increases as the planar area of each light-emitting element LEL increases, a plurality of pixel drivers DP1 through DPn is connected to each light-emitting element LEL to prevent a reduction in the amount of light emitted from each light-emitting element LEL. The pixel drivers DP1 through DPn of each light-emitting pixel OSP may be formed and disposed along at least any one side surface of a light-emitting element LEL to partially overlap the light-emitting element LEL. The pixel drivers DP1 through DPn of each light-emitting pixel OSP receive control signals and an analog image signal at the same timing and drive the light-emitting element LEL at the same driving timing.

Referring to FIG. 10, the first through third sub-light-emitting pixels OSP1 through OSP3 respectively displaying red light, green light, and blue light may constitute each unit light-emitting pixel UP emitting white light, and the unit light-emitting pixels UP may be alternately and repeatedly disposed on the organic light-emitting display surface DA1. The unit light-emitting pixels UP may be disposed in a circular shape in a plan view by surrounding the center of the organic light-emitting display surface DA1 in a circular shape.

Figure 11:
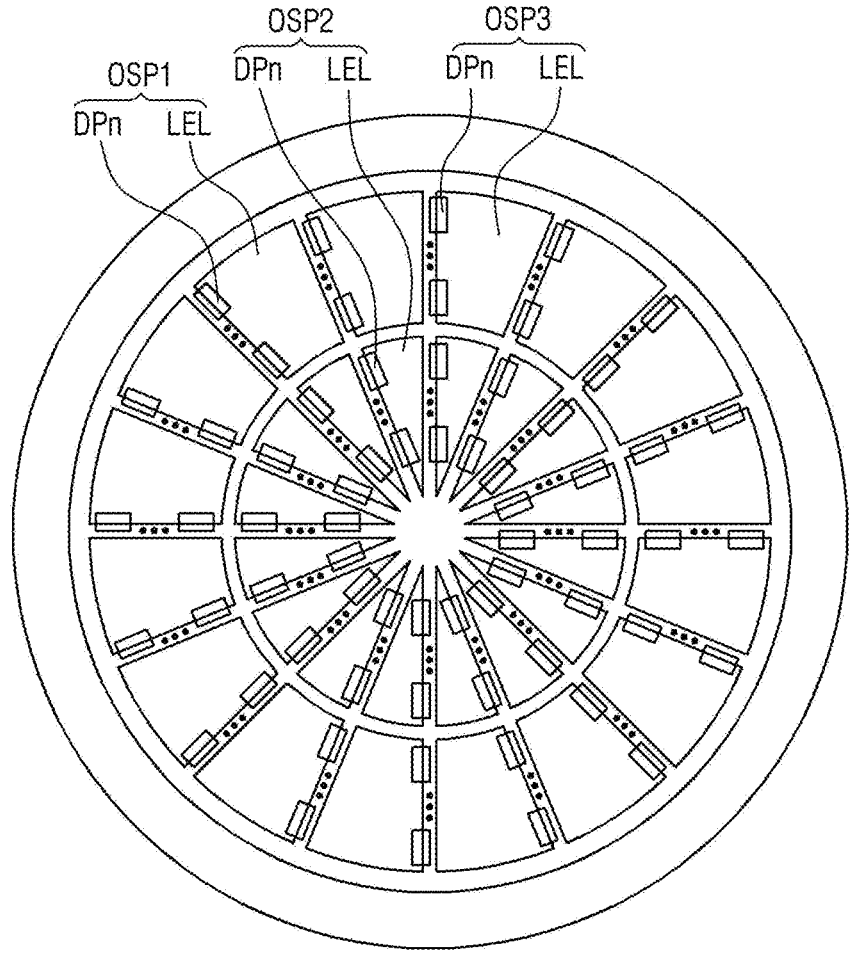
FIG. 11 is a plan view of a third embodiment illustrating the arrangement structure of the sub-light-emitting pixels of the surface light-emitting unit illustrated in FIG. 7.

FIG. 11 is a plan view of a third embodiment illustrating the arrangement structure of the sub-light-emitting pixels of the surface light-emitting unit illustrated in FIG. 7.

Referring to FIG. 11, a combination of the first through third sub-light-emitting pixels OSP1 through OSP3 formed in a sector shape, a triangular shape, and a rhombus shape in a plan view may be disposed on the organic light-emitting display surface DA1 formed in a circular shape in a plan view.

In an embodiment, the first through third sub-light-emitting pixels OSP1 through OSP3 formed in a triangular shape and a rhombus shape, that is, the light-emitting elements LEL of the first through third sub-light-emitting pixels OSP1 through OSP3 may be disposed in a circular shape in a plan view by surrounding the center of the organic light-emitting display surface DA1 in a circular shape, for example. Here, the planar area of each light-emitting element LEL may be larger as the number of light-emitting elements LEL disposed is smaller and the resolution is lower. Conversely, the planar area of each light-emitting element LEL may be smaller as the number of light-emitting elements LEL disposed is larger and the resolution is higher. However, the light-emitting elements LEL of the first through third sub-light-emitting pixels OSP1 through OSP3 may have the same planar area.

A plurality of pixel drivers DP1 through DPn is connected to each of the light-emitting elements LEL formed in a sector shape, a triangular shape, and a rhombus shape. The pixel drivers DP1 through DPn of each of the first through third sub-light-emitting pixels OSP1 through OSP3 may be formed and disposed along at least any one side surface of a light-emitting element LEL to partially overlap the light-emitting element LEL. The pixel drivers DP1 through DPn of each of the first through third sub-light-emitting pixels OSP1 through OSP3 receive control signals and a data voltage at the same timing and drive the light-emitting element LEL at the same driving timing.

As described above, the first through third sub-light-emitting pixels OSP1 through OSP3 respectively displaying red light, green light, and blue light may constitute each unit light-emitting pixel UP, and the unit light-emitting pixels UP may be alternately and repeatedly disposed on the organic light-emitting display surface DA1. The unit light-emitting pixels UP may be disposed in a circular shape in a plan view by surrounding the center of the organic light-emitting display surface DA1 in a circular shape.

Figure 12:
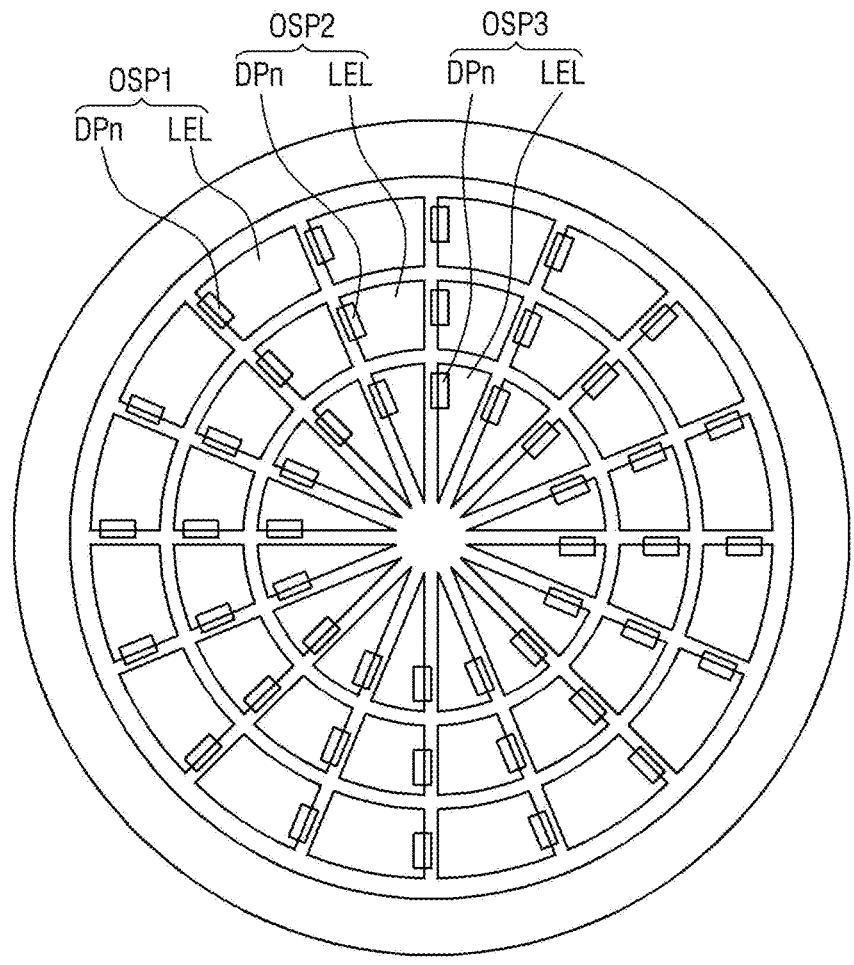
FIG. 12 is a plan view of a fourth embodiment illustrating the arrangement structure of the sub-light-emitting pixels of the surface light-emitting unit illustrated in FIG. 7.

FIG. 12 is a plan view of a fourth embodiment illustrating the arrangement structure of the sub-light-emitting pixels of the surface light-emitting unit illustrated in FIG. 7.

Referring to FIG. 12, a light-emitting element LEL included in any one of the first through third sub-light-emitting pixels OSP1 through OSP3 may be formed in a triangular shape. In addition, light-emitting elements LEL included in the other two of the first through third sub-light-emitting pixels OSP1 through OSP3 may be formed in a rhombus shape. Therefore, each unit light-emitting pixel UP composed of a combination of the first through third sub-light-emitting pixels OSP1 through OSP3 may be formed and disposed in a sector shape.

The unit light-emitting pixels UP formed in a sector shape, that is, the light-emitting elements LEL included in the first through third sub-light-emitting pixels OSP1 through OSP3 of the unit light-emitting pixels UP may be disposed in a circular shape in a plan view by surrounding the center of the organic light-emitting display surface DA1 in a circular shape. Here, the light-emitting elements LEL of the first through third sub-light-emitting pixels OSP1 through OSP3 of the unit light-emitting pixels UP may all have the same planar area.

At least one pixel driver DP1 through DPn may be connected to the light-emitting element LEL of each of the first through third sub-light-emitting pixels OSP1 through OSP3. The unit light-emitting pixels UP receive control signals and a data voltage at the same timing and drive the light-emitting element LEL at the same driving timing.

Figure 13:
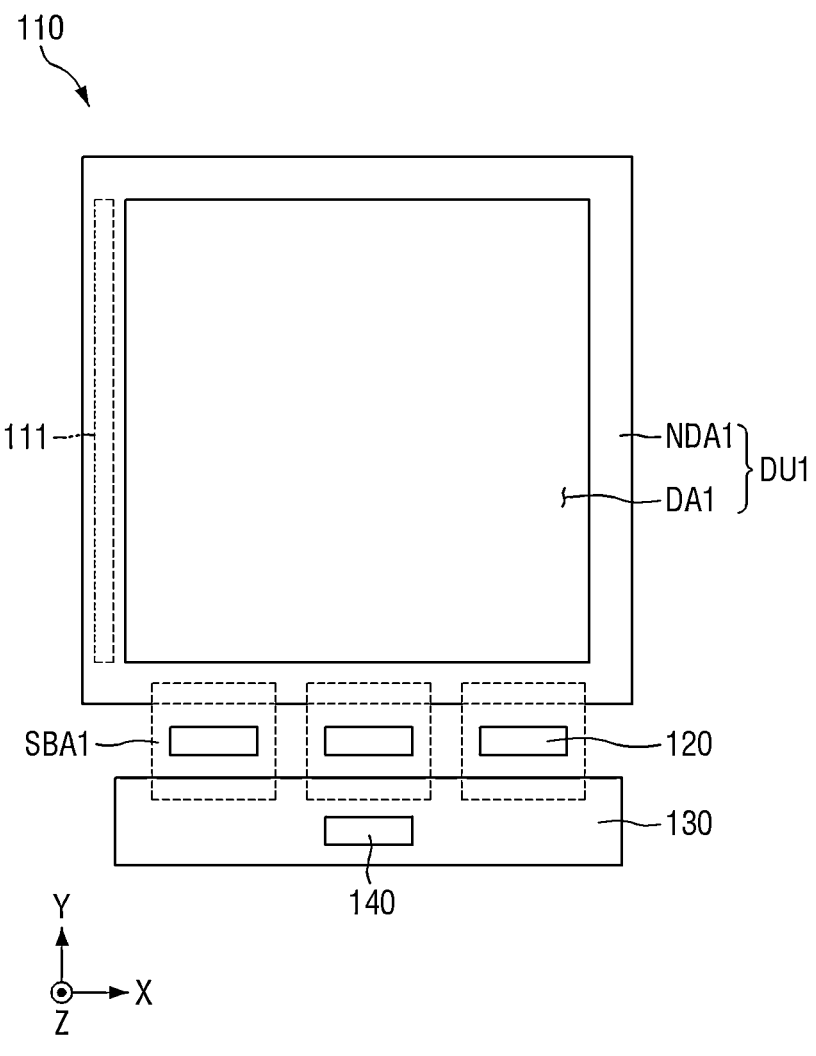
FIG. 13 is a detailed plan view of the surface light source device illustrated in FIG. 3.

FIG. 13 is a detailed plan view of the surface light source device illustrated in FIG. 3. In addition, FIG. 14 is a plan view schematically illustrating the structure of a surface light-emitting unit of the surface light source device illustrated in FIG. 13.

Figure 14:
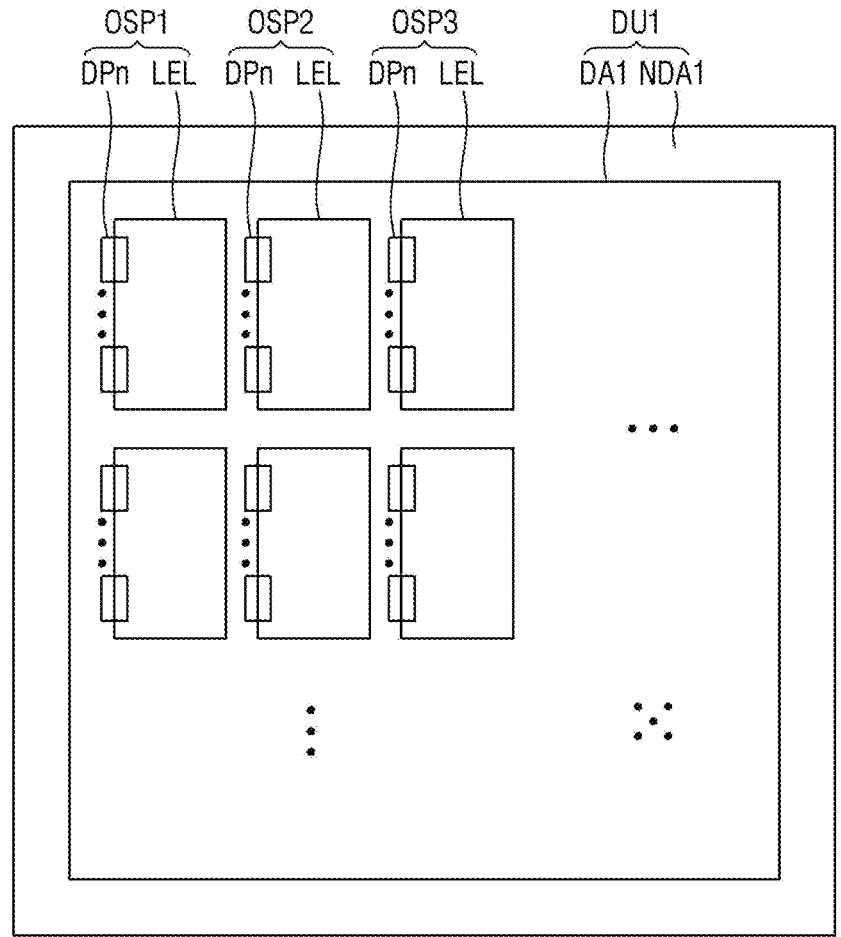
FIG. 14 is a plan view schematically illustrating the structure of a surface light-emitting unit of the surface light source device illustrated in FIG. 13.

Referring to FIGS. 13 and 14, the surface light source device 110 may have a quadrangular shape such as a rectangular shape or a square shape in a plan view. In an embodiment, when the spatial light modulator 210 is formed in a quadrangular shape such as a rectangular shape or a square shape in a plan view, the surface light source device 110 may also have a quadrangular shape such as a rectangular shape or a square shape corresponding to the planar shape of the spatial light modulator 210, for example. In an embodiment, the surface light source device 110 and the spatial light modulator 210 may also be formed in a rectangular shape with long sides disposed in the horizontal direction and short sides disposed in the vertical direction.

The surface light source device 110 includes the surface light-emitting unit DU1 which displays background light as a surface light source. Here, the surface light-emitting unit DU1 may include a plurality of sub-light-emitting pixels and may emit background light, which is a surface light source, through the sub-light-emitting pixels. The sub-light-emitting pixels in the surface light-emitting unit DU1 are formed and arranged to correspond to a preset first resolution.

A first data processor 140 extracts extended reality content image data of the first resolution from extended reality content image data input from the outside or converts the extended reality content image data input from the outside into the extended reality content image data of the preset first resolution. Then, the extended reality content image data of the first resolution is transmitted to emission driving circuits 120 of the surface light source device 110.

The emission driving circuit 120 may output data signals and voltages for driving the sub-light-emitting pixels of the surface light-emitting unit DU1. Specifically, the emission driving circuit 120 receives extended reality content image data from the first data processor 140 such as a graphic card and arranges the extended reality content image data according to the preset first resolution. Then, the extended reality content image data of the first resolution is converted into analog image signals and supplied to the sub-light-emitting pixels arranged on an organic light-emitting display surface DA1 of the surface light-emitting unit DU1.

The organic light-emitting display surface DA1 of the surface light-emitting unit DU1 is an area that displays background light through surface light emission and may be defined as a central area of the surface light-emitting unit DU1.

Light-emitting pixels OSP may be formed and disposed on the organic light-emitting display surface DA1 in units of at least three. Accordingly, the number of light-emitting elements LEL disposed on the organic light-emitting display surface DA1 may be a multiple of three (e.g., 3, 6, 9, 12, 15, 18 . . . ).

Specifically, e.g., light-emitting elements LEL of first through third sub-light-emitting pixels OSP1 through OSP3 may be formed in a quadrangular shape such as a rectangle or a square in a plan view on the organic light-emitting display surface DA1 formed in a quadrangular shape in a plan view.

Each unit light-emitting pixel UP or the first through third sub-light-emitting pixels OSP1 through OSP3 constituting each unit light-emitting pixel UP may be formed and disposed in a vertical or horizontal stripe shape on the organic light-emitting display surface DA1. The planar area of each light-emitting element LEL is inversely proportional to the number of resolutions. That is, as illustrated in FIG. 14, the planar area of each light-emitting element LEL may be larger as the number of light-emitting elements LEL disposed is smaller and the resolution is lower. Conversely, the planar area of each light-emitting element LEL may be smaller as the number of light-emitting elements LEL disposed is larger and the resolution is higher. However, the light-emitting elements LEL of the first through third sub-light-emitting pixels OSP1 through OSP3 may have the same planar area.

A plurality of pixel drivers DP1 through DPn is connected to each light-emitting element LEL formed in a quadrangular shape. The pixel drivers DP1 through DPn of each of the first through third sub-light-emitting pixels OSP1 through OSP3 may partially overlap a light-emitting element LEL and may be formed and disposed along at least any one side surface of the light-emitting element LEL. The pixel drivers DP1 through DPn of each of the first through third sub-light-emitting pixels OSP1 through OSP3 receive control signals and a data voltage at the same timing and drive the light-emitting element LEL at the same driving timing.

Figure 15A:
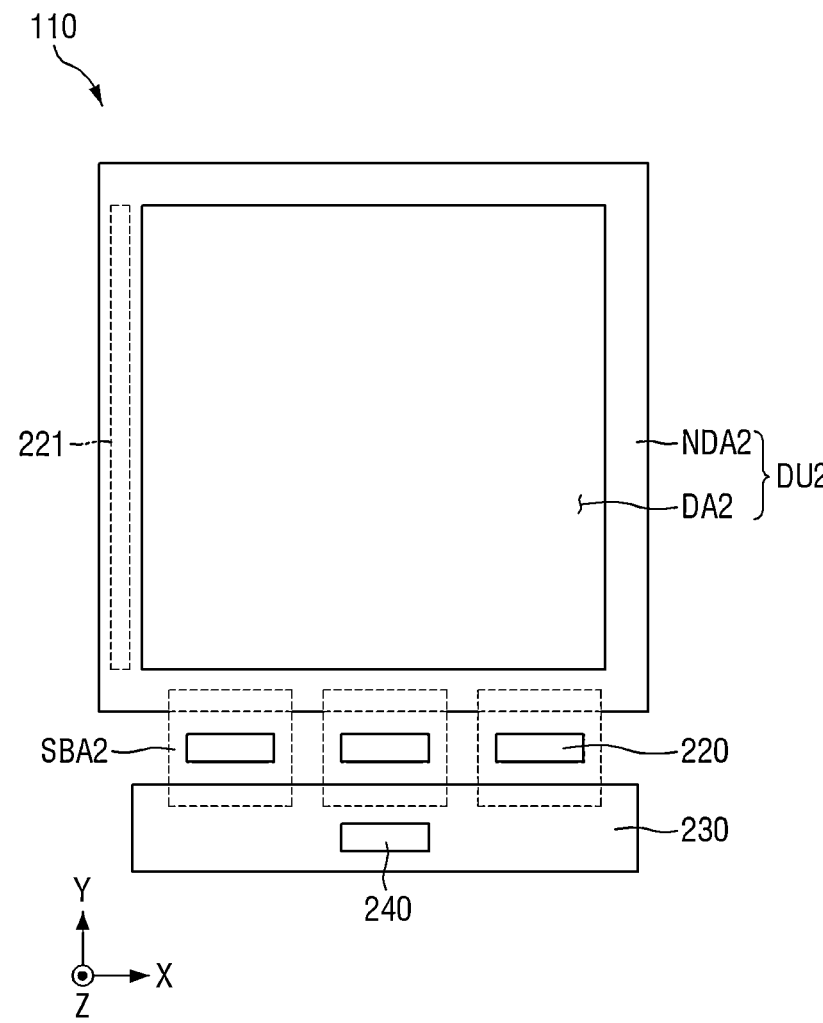
FIG. 15A is a detailed plan view of the spatial light modulator illustrated in FIG. 3.
Figure 15B:
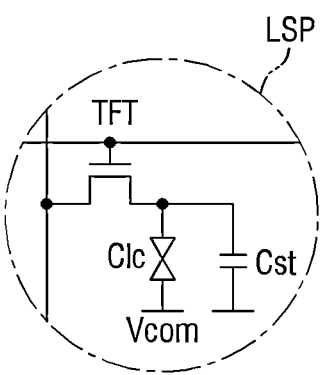
FIG. 15B is an enlarged view of a dot-dashed circular portion of FIG. 15A.

FIG. 15A is a detailed plan view of the spatial light modulator illustrated in FIG. 3, and FIG. 15A is a detailed plan view of the spatial light modulator illustrated in FIG. 3, FIG. 15B is an enlarged view of a dot-dashed circular portion of FIG. 15A.

Referring to FIG. 15A, the spatial light modulator 210 serves as an extended reality content image display device that displays an extended reality content image on a front surface by background light provided from the surface light source device 110 disposed behind the spatial light modulator 210.

The spatial light modulator 210 may be formed in the same planar shape as the surface light source device 110 that provides background light as a backlight and may have a quadrangular such as a rectangular shape or a square shape, a circular shape, or an elliptical shape in a plan view. In an embodiment, when the surface light source device 110 is formed in a quadrangular, e.g., rectangular shape, the spatial light modulator 210 may have a quadrangular, e.g., rectangular shape corresponding to the shape of the surface light source device 110 with long sides disposed in the horizontal direction, for example. However, the disclosure is not limited thereto. The long sides may also be disposed in the vertical direction, or the spatial light modulator 210 may also be rotatably installed so that its long sides may be variably disposed in the horizontal or vertical direction. The spatial light modulator 210 may also be formed in a circular shape in a plan view, like the surface light source device 110.

Referring to FIG. 15A, the spatial light modulator 210 includes a liquid crystal image display unit DU2 and a second data processor 240.

The liquid crystal image display unit DU2 displays an extended reality content image on a front surface in a front surface direction (a direction substantially perpendicular to the front surface) by background light provided from the surface light source device 110 disposed behind the spatial light modulator 210. The liquid crystal image display unit DU2 includes a plurality of liquid crystal pixels and displays an extended reality content image through the liquid crystal pixels. The liquid crystal pixels in the liquid crystal image display unit DU2 are formed and arranged to correspond to a preset second resolution.

The second data processor 240 supplies extended reality content image data to display driving circuits 220 which drive the liquid crystal pixels of the liquid crystal image display unit DU2. In an embodiment, the second data processor 240 may be disposed on a second circuit board 230, and the display driving circuits 220 may be dispose din a second sub-area SBA2.

The second data processor 240 extracts extended reality content image data of the second resolution from extended reality content image data input from the outside or converts the extended reality content image data input from the outside into the extended reality content image data of the preset second resolution. Then, the extended reality content image data of the second resolution is transmitted to the display driving circuits 220 of the spatial light modulator 210.

The display driving circuits 220 of the spatial light modulator 210 may output data signals and voltages for driving the liquid crystal pixels of the liquid crystal image display unit DU2. Specifically, the display driving circuits 220 receive extended reality content image data from the second data processor 240 such as a graphic card and arrange the extended reality content image data according to the preset second resolution. Then, the extended reality content image data of the second resolution is converted into analog image signals and supplied to the liquid crystal pixels arranged on an image display surface DA2 of the liquid crystal image display unit DU2.

FIG. 16 is a plan view schematically illustrating the structure of the liquid crystal image display unit of the spatial light modulator illustrated in FIG. 15A.

Referring to FIGS. 15A to 16, the image display surface DA2 is an image display area that displays an extended reality content image and may be defined as a central area of the liquid crystal image display unit DU2. The image display surface DA2 may include a plurality of liquid crystal pixels LSP, a plurality of gate lines GL, a plurality of data lines DL, and a plurality of power lines VL. Each of the liquid crystal pixels LSP may be defined as a minimum unit that displays an extended reality content image by passing background light therethrough.

Each of the liquid crystal pixels LSP includes a data lines DL, a gate lines GL crossing the data lines DL, a thin-film transistor TFT formed at an intersection of the data line DL and the gate line GL, a pixel electrode connected to the thin-film transistor TFT, a liquid crystal cell Clc formed in an area between the pixel electrode and a common electrode, and a storage capacitor Cst formed in parallel to the liquid crystal cell Clc as illustrated in FIG. 15B. The liquid crystal cell Cle is driven by a difference voltage between a data voltage of the pixel electrode and a common voltage Vcom of the common electrode and an electric field according to the difference voltage. The liquid crystal cell Clc realizes image display light by diffracting and passing background light through the difference voltage between the data voltage and the common voltage Vcom and the electric field according to the difference voltage. A color filter may be disposed on each liquid crystal pixel LSP to display a color image.

The gate lines GL may supply gate signals received from a second gate driver 221 to the liquid crystal pixels LSP. The gate lines GL may extend in the X-axis direction and may be spaced apart from each other in the Y-axis direction crossing the X-axis direction.

The data lines DL may supply image data voltages received from a display driving circuit 220 to the liquid crystal pixels LSP. The data lines DL may extend in the Y-axis direction and may be spaced apart from each other in the X-axis direction.

The power lines VL may supply power supply voltages such as the common voltage Vcom received from the display driving circuit 220 to the liquid crystal pixels LSP.

A second non-display area NDA2 may include the second gate driver 221, fan-out lines FOL, and gate control lines GCL2. The second gate driver 221 may generate a plurality of gate signals based on a gate control signal and may sequentially supply the gate signals to the gate lines GL according to a set order.

The fan-out lines FOL may extend from the display driving circuit 220 to the image display surface DA2. The fan-out lines FOL may supply data voltages received from the display driving circuit 220 to the data lines DL.

The second gate control lines GCL2 may extend from the display driving circuit 220 to the second gate driver 221. The second gate control lines GCL2 may supply gate control signals received from the display driving circuit 220 to the second gate driver 221.

The display driving circuit 220 may output control signals and image data voltages for driving the liquid crystal pixels LSP of the image display surface DA2 to the fan-out lines FOL. The display driving circuit 220 may supply image data voltages to the data lines DL through the fan-out lines FOL. The image data voltages may be supplied to the liquid crystal pixels LSP and may determine luminances of the liquid crystal pixels LSP. The display driving circuit 220 may supply gate control signals to the second gate driver 221 through the gate control lines GCL.

Figure 17:
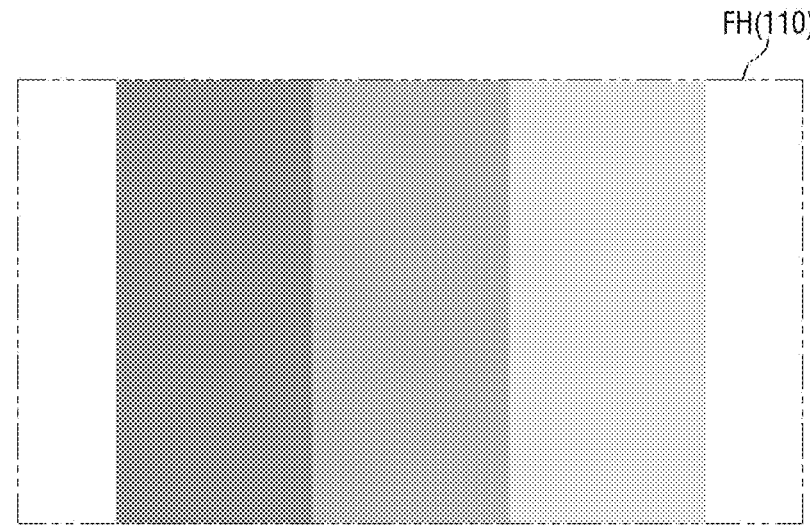
FIG. 17 illustrates an embodiment of background light and background light display resolution of a surface light source device.

FIG. 17 illustrates an embodiment of background light and background light display resolution of a surface light source device.

Figure 20:
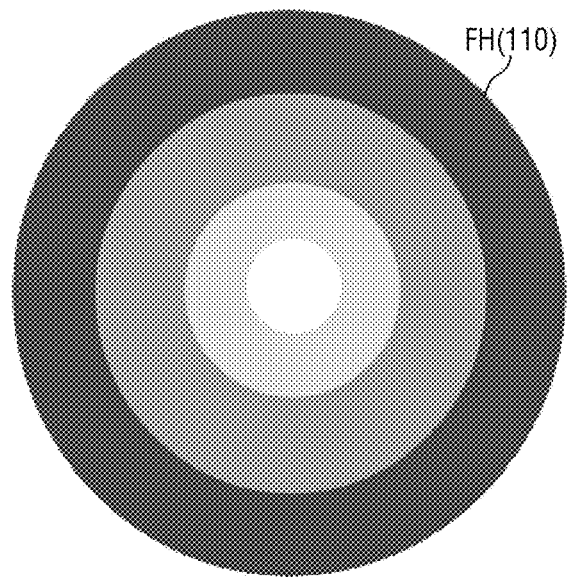
FIG. 20 illustrates an embodiment of background light and background light display resolution of a surface light source device.
Figure 21:
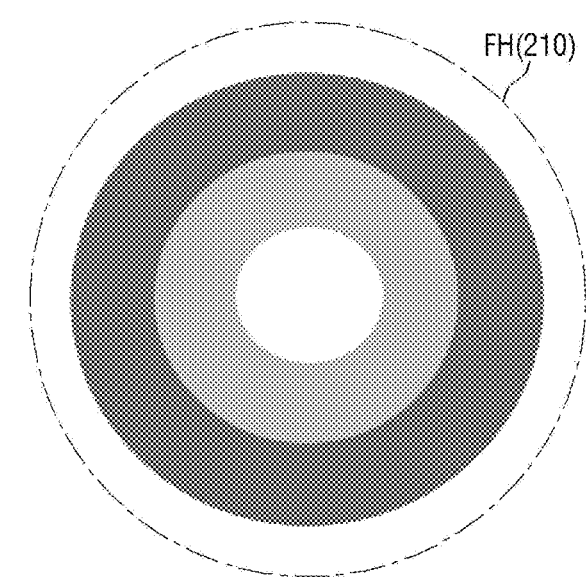
FIG. 21 illustrates an embodiment of a display image and image display resolution of a spatial light modulator.

Referring to FIG. 20, a first data processor 140 of the surface light source device 110 may convert extended reality content image data input from the outside into extended reality content image data of a preset first resolution. Then, the extended reality content image data of the first resolution is transmitted to an emission driving circuit 120 of the surface light source device 110.

The emission driving circuit 120 of the surface light source device 110 receives the extended reality content image data of the first resolution from the first data processor 140 and arranges the extended reality content image data according to the first resolution. Then, the extended reality content image data of the first resolution is converted into analog image signals and supplied to the sub-light-emitting pixels arranged on an organic light-emitting display surface DA1 of a surface light-emitting unit DU1. An image FH (110) according to the first resolution is displayed on the organic light-emitting display surface DA1 of the surface light-emitting unit DU1, and image display light according to the first resolution is provided to the spatial light modulator 210 as a surface light source and as background light.

Figure 18:
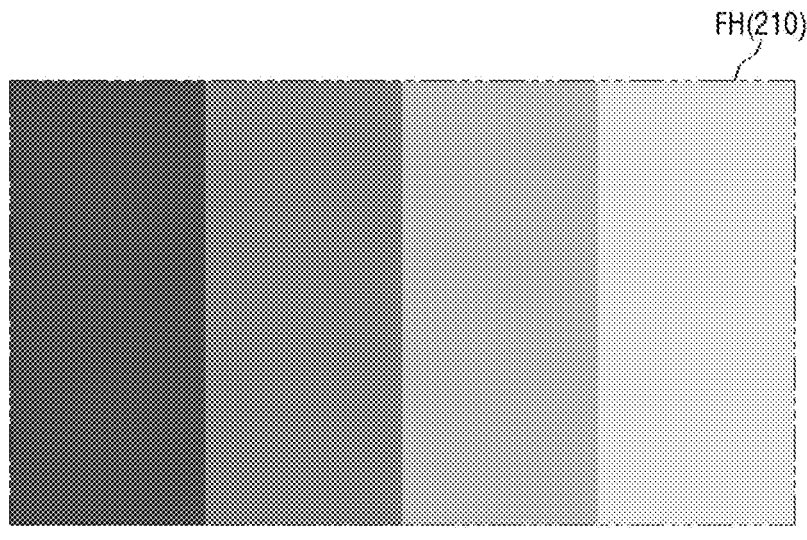
FIG. 18 illustrates an embodiment of a display image and image display resolution of a spatial light modulator.

FIG. 18 illustrates an embodiment of a display image and image display resolution of a spatial light modulator.

Referring to FIG. 18, a second data processor 240 of the spatial light modulator 210 converts extended reality content image data input from the outside into extended reality content image data of a preset second resolution. Then, the extended reality content image data of the second resolution is transmitted to a display driving circuit 220 of the spatial light modulator 210.

As described above, the second resolution of the spatial light modulator 210 may be set to be different from the first resolution of the surface light source device 110. That is, the second resolution of the spatial light modulator 210 may be set to be higher than the first resolution of the surface light source device 110.

The display driving circuit 220 of the spatial light modulator 210 receives the extended reality content image data of the second resolution from the second data processor 240 and arranges the extended reality content image data according to the preset second resolution. Then, the extended reality content image data of the second resolution is converted into analog image signals and supplied to liquid crystal pixels arranged on an image display surface DA2 of a liquid crystal image display unit DU2. Accordingly, the spatial light modulator 210 generates an extended reality content image FH (210) of the second resolution higher than the first resolution by the background light of the first resolution provided from the surface light source device 110 and displays the extended reality content image FH (210) on a front surface.

Figure 19:
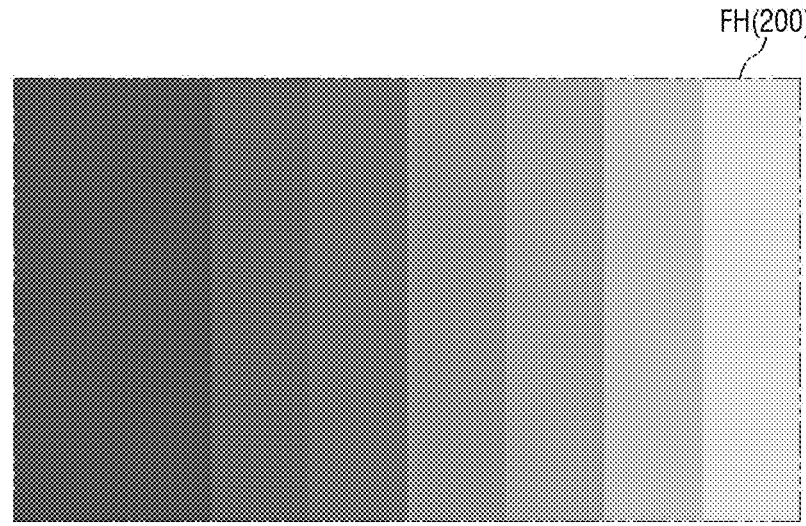
FIG. 19 illustrates an embodiment of the resolution of an extended reality content image displayed through a display device.

FIG. 19 illustrates an embodiment of the resolution of an extended reality content image displayed through a display device.

Referring to FIG. 19, the background light of the first resolution provided from the surface light source device 110 and the extended reality content image FH (210) of the second resolution according to the spatial light modulator 210 are mixed so that an extended reality content image FH (200) of a third resolution is displayed on the front surface of the spatial light modulator 210.

The extended reality content image FH (200) of the third resolution is supplied to an image transmission member 310, and the image transmission member 310 forms a display path (or light path) of the extended reality content image FH (200) so that the extended reality content image FH of the third resolution may be displayed on a preset space or display surface. Accordingly, the extended reality content image FH (210) displayed through at least one spatial light modulator 210 is directed to a predetermined space through an optical waveguide, a diffusion lens and at least one focusing lens and recognized as the extended reality content image FH (200) in real space.

FIG. 20 illustrates an embodiment of background light and background light display resolution of a surface light source device. FIG. 20 illustrates an embodiment of a display image and image display resolution of a spatial light modulator.

Referring to FIGS. 12 and 13, an emission driving circuit 120 of the surface light source device 110 receives extended reality content image data of a first resolution from a first data processor 140 and arranges the extended reality content image data according to the first resolution. Then, the extended reality content image data of the first resolution is converted into an analog image signal and supplied to sub-light-emitting pixels arranged on an organic light-emitting display surface DA1 of a surface light-emitting unit DU1.

An image FH (110) according to the first resolution is displayed on the organic light-emitting display surface DA1 of the surface light-emitting unit DU1, and image display light according to the first resolution is provided to the spatial light modulator 210 as a surface light source and as background light.

A display driving circuit 220 of the spatial light modulator 210 receives extended reality content image data of a second resolution from a second data processor 240 and arranges the extended reality content image data according to the preset second resolution. Then, the extended reality content image data of the second resolution is converted into an analog image signal and supplied to liquid crystal pixels arranged on an image display surface DA2 of a liquid crystal image display unit DU2.

The spatial light modulator 210 generates an extended reality content image FH (210) of the second resolution higher than the first resolution by the background light of the first resolution provided from the surface light source device 110 and displays the extended reality content image FH (210) on a front surface.

Figure 22:
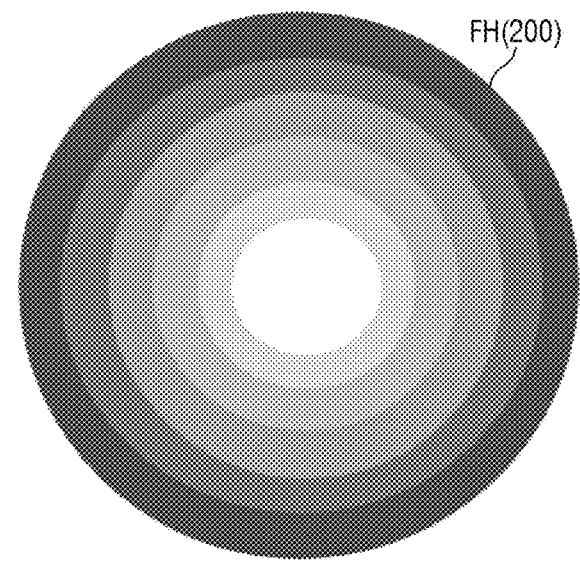
FIG. 22 illustrates an embodiment of a resolution of an extended reality contents image displayed through a display device.

FIG. 22 illustrates an embodiment of a resolution of an extended reality contents image displayed through a display device.

As illustrated in FIG. 14, the background light of the first resolution provided from the surface light source device 110 and the extended reality content image FH (210) of the second resolution according to the spatial light modulator 210 are mixed so that an extended reality content image FH (200) of a third resolution is displayed on the front surface of the spatial light modulator 210.

The extended reality content image FH (200) of the third resolution is supplied to an image transmission member 310, and the image transmission member 310 forma a display path (or light path) of the extended reality content image FH (200) so that the extended reality content image FH of the third resolution may be displayed on a preset space or display surface.

In concluding the detailed description, those skilled in the art will appreciate that many variations and modifications may be made to the preferred embodiments without substantially departing from the principles of the disclosure. Therefore, the disclosed preferred embodiments of the disclosure are used in a generic and descriptive sense only and not for purposes of limitation.

What is claimed is:

1. A display device comprising:
at least one spatial light modulator which displays an extended reality content image;
a surface light source device which is disposed behind the at least one spatial light modulator and provides image display light of a first resolution to the spatial light modulator as background light; and at least one image transmission member which defines a display path of the extended reality content image, wherein the surface light source device comprises an organic light-emitting display unit in which a plurality of sub-light-emitting pixels which perform surface light emission is arranged and an emission driving circuit which drives the each of the plurality of sub-light-emitting pixels of the organic light-emitting display unit, wherein the at least one spatial light modulator generates the extended reality content image of a second resolution by the image display light, and wherein the first resolution is lower than the second resolution.

2. The display device of claim 1, wherein the emission driving circuit generates gate control signals and analog image signals for driving the plurality of sub-light-emitting pixels at a same timing in units of at least one frame, the gate control signals are supplied to a first gate driver in units of at least one frame, and the analog image signals are simultaneously supplied to the plurality of sub-light-emitting pixels.

3. The display device of claim 2, wherein the plurality of sub-light-emitting pixels includes:

a plurality of pixel drivers which simultaneously receive the gate control signals, and a light-emitting element connected in parallel to the plurality of pixel drivers to emit light by the drive of the plurality of pixel drivers, wherein the plurality of pixel drivers receives the gate control signals which are identical to each other and the analog image signals which are identical to each other at a same timing through the emission driving circuit and the first gate driver to cause the light-emitting element to emit light.

4. The display device of claim 2, wherein each of the plurality of sub-light-emitting pixels includes a plurality of pixel drivers and a light-emitting element, and wherein each of the light-emitting elements included in each of the plurality of sub-light-emitting pixels is formed in an organic light-emitting display surface of the surface light source device in at least any one of a sector shape, a triangular shape, a rhombus shape, a quadrangular shape, a circular shape, a semicircular shape and an elliptical shape or is formed in a combination of different shapes.

5. The display device of claim 4, wherein the light-emitting elements included in each of the plurality of sub-light-emitting pixels are disposed in the circular shape in a plan view by surrounding a center of the organic light-emitting display surface in the circular shape or are disposed in the quadrangular shape in the plan view by surrounding the center of the organic light-emitting display surface in the quadrangular shape.

6. The display device of claim 4, wherein the plurality of pixel drivers included in each of the plurality of sub-light-emitting pixels and the light-emitting element are connected in parallel structure, wherein the plurality of pixel drivers included in each of the plurality of sub-light-emitting pixels partially overlaps each of the light-emitting element to be formed and arranged along at least any one side direction of the light-emitting element, and wherein the plurality of pixel drivers included in each of the plurality of sub-light-emitting pixels is supplied with the gate control signals which are identical to each other and the analog image signals which are identical to each other at a same time to drive each of the light-emitting element at a same time.

7. The display device of claim 4, wherein three sub-light-emitting pixels which respectively display red light, green light and blue light, among the plurality of sub-light-emitting pixels, constitute each unit light-emitting pixel which emits white light, the unit light-emitting pixels are alternately and repeatedly disposed on the organic light-emitting display surface, and a combination of the three sub-light-emitting pixels formed in the sector shape, the triangular shape and the rhombus shape in a plan view are disposed in each unit light-emitting pixel.

8. The display device of claim 6, wherein a light-emitting element included in any one of three sub-light-emitting pixels of each unit light-emitting pixel is formed in the triangular shape, and light-emitting elements included in remaining two of the three sub-light-emitting pixels are formed in the rhombus shape so that each unit light-emitting pixel comprised of a combination of the three sub-light-emitting pixels is formed and disposed in the sector shape.

9. The display device of claim 7, wherein the three sub-light-emitting pixels of each unit light-emitting pixel are disposed in the circular shape in the plan view by surrounding a center of the organic light-emitting display surface in the circular shape and are formed to have a same planar area.

10. The display device of claim 1, wherein the surface light source device further comprises a first data processor which extracts extended reality content image data of the first resolution from extended reality content image data input from an outside or converts the extended reality content image data input from the outside into the extended reality content image data of the first resolution, and the emission driving circuit converts the extended reality content image data of the first resolution into analog image signals and supplies the analog image signals to the plurality of sub-light-emitting pixels of the organic light-emitting display unit.

11. The display device of claim 10, wherein the at least one image transmission member defines a display path of an extended reality content image of a third resolution in which the image display light of the first resolution and the extended reality content image of the second resolution are mixed.

12. The display device of claim 11, wherein the spatial light modulator includes:

a liquid crystal image display unit which displays an extended reality content image of the second resolution in a front surface direction by, as the background light, the image display light of the first resolution provided from the surface light source device disposed behind the spatial light modulator;

a second data processor which extracts extended reality content image data of the second resolution from extended reality content image data input from the outside or converts the extended reality content image data input from the outside into the extended reality content image data of the second resolution; and a display driving circuit which converts the extended reality content image data of the second resolution into analog image signals and supplies the analog image signals to liquid crystal pixels of the liquid crystal image display unit.

13. The display device of claim 11,
wherein the first resolution is a resolution set lower than the second resolution, and the third resolution is a mixed resolution of the first resolution and the second resolution.

14. The display device of claim 1,
wherein the surface light source device generates the image display light of the first resolution as a surface light source by converting extended reality content image data input from an outside into extended reality content image data of the first resolution, converting the extended reality content image data of the first resolution into analog image signals, and supplying the analog image signals to the plurality of sub-light-emitting pixels of the organic light-emitting display unit.

15. The display device of claim 14,
wherein the spatial light modulator converts the extended reality content image data input from the outside into extended reality content image data of a second resolution, converts the extended reality content image data of the second resolution into analog image signals and supplies the analog image signals to liquid crystal pixels of a liquid crystal image display unit, and generates an extended reality content image of the second resolution by, as the background light, the image display light of the first resolution provided from the surface light source device disposed behind the spatial light modulator, and
wherein the at least one image transmission member forms a display path of an extended reality content image of a third resolution in which the image display light of the first resolution and the extended reality content image of the second resolution are mixed.

16. A display device comprising:
at least one spatial light modulator which displays an extended reality content image;
a surface light source device disposed behind the at least one spatial light modulator and provides image display light of a first resolution to the spatial light modulator as background light; and
at least one image transmission member which defines a display path of the extended reality content image,
wherein the surface light source device comprises an organic light-emitting display unit in which a plurality of sub-light-emitting pixels which perform surface light emission is arranged and an emission driving circuit which drives the plurality of sub-light-emitting pixels of the organic light-emitting display unit,
wherein the plurality of sub-light-emitting pixels comprises a plurality of pixel drivers and one light-emitting element,
wherein the light-emitting element included in each of the plurality of sub-light-emitting pixels is formed in an organic light-emitting display surface of the surface light source device in at least any one of a sector shape, a triangular shape, a rhombus shape, a quadrangular shape, a circular shape, a semicircular shape and an elliptical shape or is formed in a combination of different shapes,
wherein the at least one spatial light modulator generates the extended reality content image of a second resolution by the image display light, and
wherein the first resolution is lower than the second resolution.

17. The display device of claim 16,
wherein the emission driving circuit generates gate control signals and analog image signals for driving the plurality of sub-light-emitting pixels at a same timing in units of at least one frame, the gate control signals are supplied to a first gate driver in units of at least one frame, and wherein the analog image signals are simultaneously supplied to the plurality of sub-light-emitting pixels.

18. The display device of claim 17,
wherein the plurality of pixel drivers simultaneously receives the gate control signals,
wherein the plurality of sub-light-emitting pixels further includes:
a light-emitting element connected in parallel to the plurality of pixel drivers to emit light by the plurality of pixel drivers, and
wherein the plurality of pixel drivers receives the gate control signals which are identical to each other and the analog image signals which are identical to each other at a same timing through the emission driving circuit and the first gate driver to cause the light-emitting element to emit light.

19. The display device of claim 17,
wherein the light-emitting elements included in each of the plurality of sub-light-emitting pixels are disposed in the circular shape in a plan view by surrounding a center of an organic light-emitting display surface in the circular shape or are disposed in the quadrangular shape in the plan view by surrounding the center of the organic light-emitting display surface in the quadrangular shape.

20. An electronic device including a display device,
wherein the display device comprising:
at least one spatial light modulator which displays an extended reality content image;
a surface light source device which is disposed behind the at least one spatial light modulator and provides image display light of a first resolution to the spatial light modulator as background light; and
at least one image transmission member which defines a display path of the extended reality content image,
wherein the surface light source device comprises an organic light-emitting display unit in which a plurality of sub-light-emitting pixels which perform surface light emission is arranged and an emission driving circuit which drives the each of the plurality of sub-light-emitting pixels of the organic light-emitting display unit,
wherein the at least one spatial light modulator generates the extended reality content image of a second resolution by the image display light, and
wherein the first resolution is lower than the second resolution.

* * * * *